US012598590B2

(12) United States Patent
Liu et al.

(10) Patent No.: US 12,598,590 B2
(45) Date of Patent: Apr. 7, 2026

(54) TRANSMISSION OR RECEPTION CONFIGURATION METHOD AND TERMINAL

(71) Applicant: VIVO MOBILE COMMUNICATION CO., LTD., Dongguan (CN)

(72) Inventors: Siqi Liu, Dongguan (CN); Zichao Ji, Dongguan (CN); Shixiao Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 734 days.

(21) Appl. No.: 17/947,074

(22) Filed: Sep. 16, 2022

(65) Prior Publication Data

US 2023/0019322 A1     Jan. 19, 2023

Related U.S. Application Data

(63) Continuation of application No. PCT/CN2021/080397, filed on Mar. 12, 2021.

(30) Foreign Application Priority Data

Mar. 19, 2020     (CN) ......................... 202010197809.3

(51) Int. Cl.
*H04W 72/0446*     (2023.01)
(52) U.S. Cl.
CPC ............................... *H04W 72/0446* (2013.01)
(58) Field of Classification Search
None
See application file for complete search history.

(56) References Cited

U.S. PATENT DOCUMENTS

| | | | | |
|---|---|---|---|---|
| 2021/0329732 A1* | 10/2021 | Zhang | | H04W 72/20 |
| 2022/0368461 A1* | 11/2022 | Zhang | | H04W 72/23 |
| 2023/0231654 A1* | 7/2023 | Ganesan | | H04L 5/0044 |
| | | | | 370/329 |

FOREIGN PATENT DOCUMENTS

| | | | | |
|---|---|---|---|---|
| CN | 110351898 A | 10/2019 | | |
| CN | 110391867 A | 10/2019 | | |
| CN | 110557806 A | 12/2019 | | |
| CN | 110719635 A | 1/2020 | | |
| CN | 110719645 A | 1/2020 | | |
| CN | 110798297 A | 2/2020 | | |
| WO | 2019001286 A1 | 1/2019 | | |
| WO | WO-2020033381 A1 * | 2/2020 | ........ | H04W 74/0816 |

OTHER PUBLICATIONS

International Search Report issued in corresponding International Application No. PCT/CN2021/080397, mailed Jun. 10, 2021, 6 pages.

(Continued)

*Primary Examiner* — Robert M Morlan
(74) *Attorney, Agent, or Firm* — IPX PLLC

(57)     ABSTRACT

A transmission or reception configuration method and a terminal are provided. The transmission or reception configuration method is performed by a terminal and includes: obtaining a transmission or reception configuration, where the transmission or reception configuration is used to indicate a first time domain range in which the terminal does not monitor a target object or a second time domain range in which the terminal monitors a target object.

14 Claims, 4 Drawing Sheets

Start

Obtain a transmission or reception configuration     601

End

(56) References Cited

OTHER PUBLICATIONS

Huawei et al., "Remaining details of sidelink resource allocation mode 2", 3GPP TSG RAN WG1 Meeting #100-e R1-2000183, Mar. 6, 2020.

Huawei et al., "Sidelink resource allocation mode 2 for NR V2X", 3GPP TSG RAN WG1 Meeting #99 R1-1911884, Nov. 22, 2019.

* cited by examiner

TRANSMISSION OR RECEPTION CONFIGURATION METHOD AND TERMINAL

CROSS-REFERENCE TO RELATED APPLICATIONS

This application is a continuation of International Application No. PCT/CN2021/080397, filed Mar. 12, 2021, which claims priority to Chinese Patent Application No. 202010197809.3, filed Mar. 19, 2020. The entire contents of each of the above-referenced applications are expressly incorporated herein by reference.

TECHNICAL FIELD

The present disclosure relates to the field of communications technologies, and in particular, to a transmission or reception configuration method and a terminal.

BACKGROUND

In Uu Discontinuous Reception (DRX) between a terminal and a network side device, a user monitors only a Physical Downlink Control Channel (PDCCH) within an active time, to implement energy saving, where the active time includes duration (on duration), an inactivity timer runtime, and a retransmission timer runtime. Uu DRX does not impose a limitation on the time of uplink transmission and another downlink transmission of the user. For example, the user may send a Hybrid Automatic Repeat Request Acknowledgement (HARQ-ACK) to a base station outside the active time.

A sidelink (SL) Semi-Persistent Scheduling (SPS) period may include one or more SL resources, an SL Configuration Grant (CG) period may include one or more SL resources, an SL downlink control information (DCI) (DCI for scheduling an SL transmission resource) may schedule one or more SL resources, and one piece of Sidelink Control Information (SCI) may schedule one or more SL resources. These resources may be reserved for subsequent transmission within a period of time. Each of the foregoing resources may include SCI, and only a part of resources scheduled in a same period or by one piece of DCI or indicated by one piece of SCI may be within an active time, and the other part of resources are outside the active time. Physical Sidelink Feedback Channel (PSFCH) corresponding to resources scheduled in a same period or by one piece of DCI or indicated by one piece of SCI may be outside the active time.

If the design of Uu DRX is directly reused, the user no longer receives these pieces of SCI or PSFCHs, resulting in a packet loss, low reliability, and low resource utilization. In addition, it cannot be ensured that different terminals, or a terminal and a base station have the same understanding of feedback content and/or resources, resulting in incorrect scheduling.

SUMMARY

Embodiments of the present disclosure provide a transmission or reception configuration method and a terminal.

According to a first aspect, an embodiment of the present disclosure provides a transmission or reception configuration method, performed by a first terminal and including:

obtaining a transmission or reception configuration, where the transmission or reception configuration is used to indicate a first time domain range in which the first terminal does not monitor a target object and/or a second time domain range in which the first terminal monitors a target object.

According to a second aspect, an embodiment of the present disclosure provides a transmission or reception configuration method, performed by a second terminal and including:

obtaining a transmission or reception configuration, where the transmission or reception configuration is used to indicate a third time domain range in which the second terminal does not send a target object and/or a fourth time domain range in which the second terminal sends a target object.

According to a third aspect, an embodiment of the present disclosure further provides a terminal, where the terminal is a first terminal and includes:

a first obtaining module, configured to obtain a transmission or reception configuration, where the transmission or reception configuration is used to indicate a first time domain range in which the first terminal does not monitor a target object and/or a second time domain range in which the first terminal monitors a target object.

According to a fourth aspect, an embodiment of the present disclosure further provides a terminal, where the terminal is a second terminal and includes:

a second obtaining module, configured to obtain a transmission or reception configuration, where the transmission or reception configuration is used to indicate a third time domain range in which the second terminal does not send a target object and/or a fourth time domain range in which the second terminal sends a target object.

According to a fifth aspect, an embodiment of the present disclosure further provides a terminal, including: a processor, a memory, and a computer program that is stored in the memory and that can be run on the processor, where when the computer program is executed by the processor, the steps of the foregoing transmission or reception configuration method are implemented.

According to a sixth aspect, an embodiment of the present disclosure further provide a computer-readable storage medium, where the computer-readable storage medium stores a computer program, and when the computer program is executed by a processor, the steps of the foregoing transmission or reception configuration method are implemented.

The beneficial effects of the present disclosure are as follows:

In the foregoing solutions, a transmission or reception configuration indicating a first time domain range in which a first terminal does not monitor a target object and/or a second time domain range in which the first terminal monitors a target object is used, and a target object is monitored when the transmission or reception configuration meets a requirement, thereby limiting a transmission behavior of the terminal, avoiding a packet loss, and avoiding a case that different terminals, or a terminal and a base station may have different understanding of feedback content and/or resources, to ensure scheduling accuracy and improve communication reliability and resource utilization.

DETAILED DESCRIPTION

To make the objectives, technical solutions, and advantages of the present disclosure clearer, the following describes the present disclosure in detail with reference to the accompanying drawings and specific embodiments.

In the descriptions of the embodiments of the present disclosure, some concepts used in the following descriptions are first explained and described.

Figure 1:
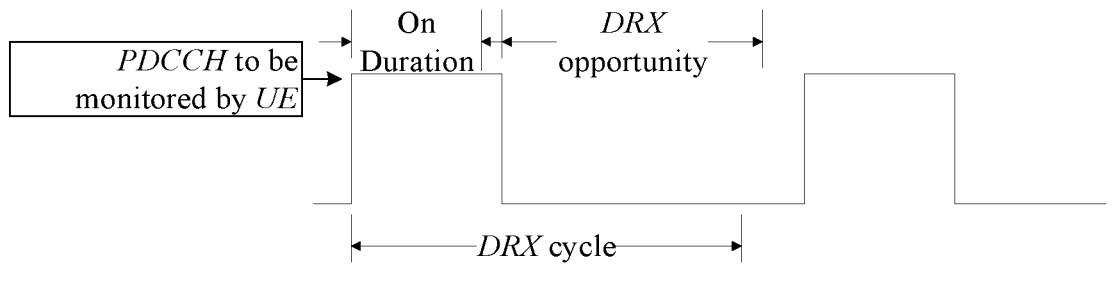
FIG. 1 is a schematic diagram of a DRX format.

1. Description of Discontinuous Reception (DRX) on an Interface (that is, a Uu Interface) Between a Long Term Evolution (LTE) Terminal and a New Radio (NR) Terminal, and a Network Side Device A DRX mechanism is introduced in both LTE and NR, and power saving of user equipment (UE) is achieved by configuring a DRX on time and a DRX off time. As shown in FIG. 1, on duration is an interval of DRX on, and the UE enters off duration of a DRX cycle if scheduling is not performed after on duration.

2. Description of a Sidelink (SL)

Figure 2:
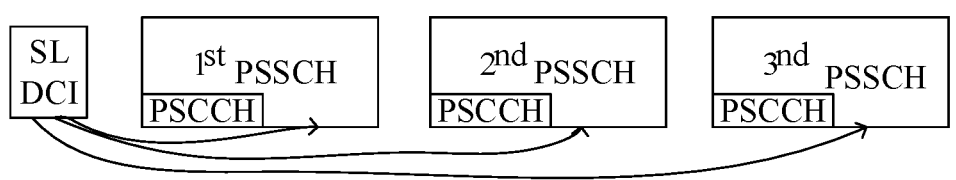
FIG. 2 is a schematic diagram of scheduling three PSCCH/PSSCH transmission resources by one piece of SL DCI.
Figure 3:
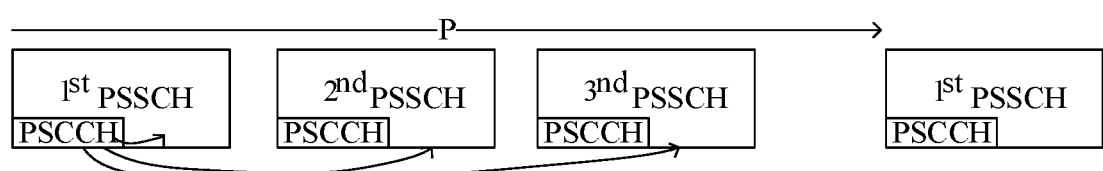
FIG. 3 is a schematic diagram of scheduling and periodically reserving three PSCCH/PSSCH transmission resources by one piece of SCI.

The sidelink design supports two resource allocation modes: a scheduled resource allocation mode (commonly referred to as a mode-1) and an autonomous resource selection mode (commonly referred to as a mode-2). In the former mode, a network side device controls and allocates a resource to each UE, and in the latter mode, the UE independently selects a resource. In the mode-1 Radio Resource Control (RRC) or one piece of Downlink control information (DCI) may indicate one or more resources, for example, as shown in FIG. 2, a resource SL configured grant (SL CG) that appears in a configuration period. In the mode-2, a user may obtain a resource through sensing (or detection), and one piece of SCI may indicate one or more resources. Further, the one or more resources may be further periodically reserved, for example, as shown in FIG. 3. In some embodiments, a terminal determines, through SCI detection and/or measuring, which resources have been occupied by another terminal, to select, from remaining resources, a resource used for transmission by the terminal.

A PSCCH in an LTE sidelink carries SCI, and a PSCCH and a PSSCH in an NR sidelink separately carry a part of the SCI. The SCI is used to schedule a PSSCH. The SCI may indicate transmission resources, and may further reserve these resources for subsequent transmission. A Physical Sidelink Feedback Channel (PSFCH) is used to feed back sidelink HARQ-ACK information. After determining sidelink HARQ-ACK information, the user may further send the sidelink HARQ-ACK information to a base station by using a PUCCH or a PUSCH.

PSFCH Resource

A PSSCH occupies N sub-channels in the frequency domain, and a PSFCH resource occupies only one resource block (RB) in frequency domain. Therefore, a quantity of PSFCH RBs in a same resource pool is far greater than a quantity of PSSCH occasions.

Figure 4:
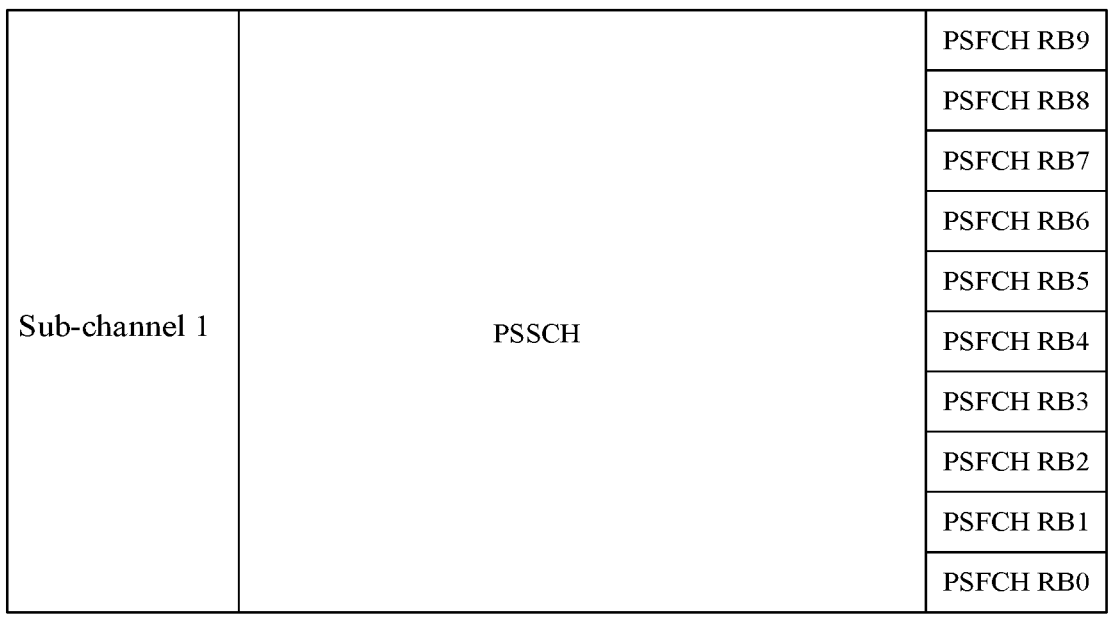
FIG. 4 is a schematic diagram of a relationship among a PSSCH, a sub-channel, and a PSFCH RB.

As shown in FIG. 4, a PSSCH resource occupies one sub-channel in frequency domain, and 10 PSFCH RBs exist in the sub-channel.

A PSFCH occasion appears once every N slots (sidelink slot), that is, a PSFCH period N=1, 2, 4. Therefore, some SL slots have a PSCCH/PSSCH and a PSFCH, and some SL slots have only a PSCCH/PSSCH without a PSFCH. In each period, N PSSCH occasions may be associated with the PSFCH occasion, and a time of a PSSCH occasion associated with the PSSCH occasion on a slot m is not earlier than m+K, where K=2, 3.

Figure 5:
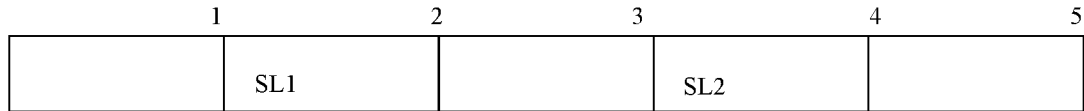
FIG. 5 is a schematic diagram of a relationship between a physical slot and a logical slot.

It should be noted that Subcarrier Spacing (SCS) of the foregoing parameters may be the same or different. K and N are logical slots (SL slot). Therefore, an actual distance between K SL slots may be greater than duration corresponding to K physical slots, and an actual distance between N SL slots may be greater than duration corresponding to N physical slots. As shown in FIG. 5, it is assumed that physical slots 2 and 4 in five physical slots are used for SL. Therefore, logical slot numbers or SL slot numbers of the two SL slots are 1 and 2. In this case, an actual distance between logical slots 1 and 2 is 2 physical slots and is greater than duration corresponding to one slot.

Cast Type and HARQ Feedback Mode

The NR sidelink supports three transmission modes: broadcast, multicast and unicast. The multicast in the NR sidelink supports two types: connection-based multicast and connection-less multicast. The connection-based multicast is a scenario in which a connection is established between multicast UEs, and the connection-less mode is a scenario in which multicast UE does not know other UE in the group, and no connection is established. In the case of multicast, a plurality of receive ends support two mechanisms when performing HARQ feedback:

Multicast mechanism 1 (option 1 NACK-only feedback or connection-less mechanism): If the data is received but cannot be parsed, a NACK is fed back; otherwise, no feedback is performed.

Multicast mechanism 2 (option 2 ACK/NACK feedback, or connection-based mechanism): If the data is received but cannot be parsed or SCI is received but no data is received, a NACK is fed back; if the data is received and is correctly parsed, an ACK is fed back.

The present disclosure provides a transmission or reception configuration method and a terminal.

Figure 6:
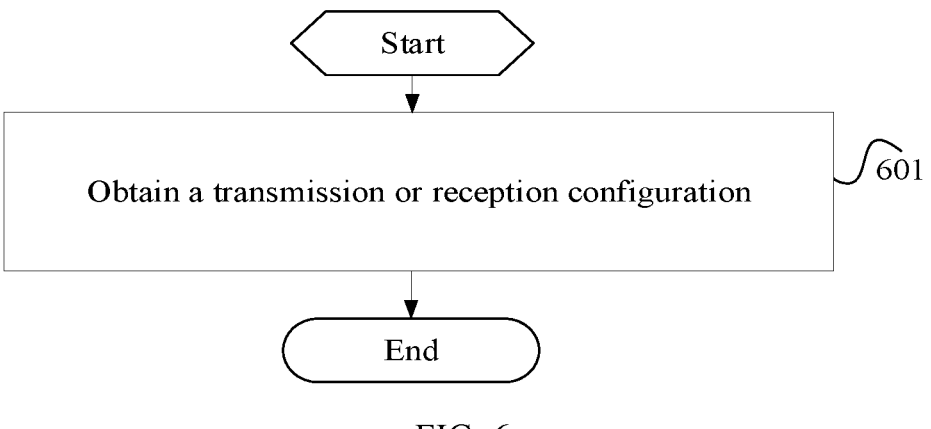
FIG. 6 is a first schematic flowchart of a transmission or reception configuration method according to an embodiment of the present disclosure.

As shown in FIG. 6, an embodiment of the present disclosure provides a transmission or reception configuration method, performed by a first terminal and including:

Step 601: Obtain a transmission or reception configuration.

It should be noted that the transmission or reception configuration is used to indicate a first time domain range in which the first terminal does not monitor a target object and/or a second time domain range in which the first terminal monitors a target object.

It should be noted herein that the first time domain range in which the first terminal does not monitor the target object means that the first terminal enables the target object to sleep in the first time domain range.

Further, it should be noted that the target object includes at least one of a first request, sidelink control information (SCI), a PSCCH, a PSSCH, a reference signal (RS), or a measurement report; and/or the target object includes at least one of a first response, a feedback resource (for example, a physical sidelink feedback channel (PSFCH)), a reference signal (RS), or a measurement report.

In some embodiments, the first request may include at least one of a synchronization request, a reference signal request, a measurement report request (for example, at least one of a CSI report request, an RSRP report request, an RSRQ report request, or an RSSI report request), a connection establishment request, a connection resume request, a link resume request, a link re-establishment request, a reconfiguration request, a retransmission request, and the like.

The reference signal may include: a CSI-RS, a PT-RS, an uplink sounding signal (SRS), a positioning reference signal (PRS), and the like.

The measurement report may be, for example, a channel state information report (CSI report), a reference signal received power report (RSRP report), a reference signal received quality report (RSRQ report), or a received signal strength indicator report (RSSI report).

In some embodiments, the first response may include a response to at least one of a synchronization request, a connection establishment request, a connection resume request, a link resume request, a link re-establishment request, a reconfiguration request, a retransmission request, or the like, for example, at least one of allowing or succeeding in synchronization, allowing or succeeding in establishing a connection, allowing or succeeding in resuming a connection, allowing or succeeding in resuming a link, allowing or succeeding in re-establishing a link, reconfiguring, and retransmitting, where the allowing or succeeding in synchronization may include at least one of allowing or succeeding being as synchronization reference, allowing or succeeding in transmitting a synchronization signal, or the like.

Further, it should be noted that the transmission or reception configuration in this embodiment of the present disclosure may restrict receiving and/or sending. When the transmission or reception configuration restricts at least receiving of a terminal, the transmission or reception configuration may be considered as a sidelink discontinuous reception (DRX) configuration.

It should be noted that because the first terminal may perform different transmission actions at different moments, target objects of the first terminal at different moments may be the same or may be different. The following separately uses examples in which the first terminal receives a physical sidelink shared channel (PSSCH) and/or a physical sidelink control channel (PSCCH) and the first terminal sends a PSSCH and/or a PSCCH to describe the target object.

In some embodiments, when the first terminal receives a PSSCH and/or a PSCCH, the target object includes at least one of a first request, sidelink control information (SCI), a PSCCH, a PSSCH, a reference signal (RS), or a measurement report.

In some embodiments, when the first terminal sends a PSSCH and/or a PSCCH, the target object includes at least one of a first response, a feedback resource (for example, a physical sidelink feedback channel (PSFCH)), a reference signal (RS), or a measurement report.

In some embodiments, the first time domain range includes a non-active time and/or a first time domain resource.

It should be noted that the non-active time and/or the first time domain resource may be configured or preconfigured by a network side device, stipulated in a protocol, indicated by another terminal, or determined by the first terminal. It should be noted that, for example, the first terminal deduces the non-active time and/or the first time domain resource by using a resource pool configuration and indication information in sidelink downlink control information (SL DCI, that is, DCI for scheduling, activating, or deactivating an SL transmission resource).

In some embodiments, the first time domain resource is an irrelevant resource.

The following separately uses examples in which the first terminal receives a PSSCH and/or a PSCCH and the first terminal sends a PSSCH and/or a PSCCH to In some embodiments describe a starting moment of the non-active time:

In some embodiments, when the first terminal receives a PSSCH and/or a PSCCH, the starting moment of the non-active time includes at least one of the following:

A11. A moment after a moment at which an acknowledgement is fed back

That is, in this case, for a transport block (TB), after the first terminal feeds back an acknowledgement (ACK), it is determined that the first terminal enters the non-active time, and the first terminal no longer monitors a target object in this period of time.

Further, at least one of unicast or a multicast mechanism 2 (option 2) is applicable to this case.

A12. A moment after a moment at which no feedback resource is sent

In some embodiments, the feedback resource may be a PSFCH. That is, in this case, for a TB, after the first terminal does not send a PSFCH, it is determined that the first terminal enters the non-active time, and the first terminal no longer monitors a target object in this period of time.

Further, a multicast mechanism 1 (option 1) is applicable to this case.

A13. A moment after A transmission resources from the moment at which the acknowledgement is fed back In some embodiments, A is a positive integer, and A represents any transmission resource. That is, in this case, for a TB, it is determined that the first terminal enters the non-active time starting from several (for example, two) transmission resources after the moment at which the first terminal feeds back the ACK, and the first terminal no longer monitors a target object in this period of time.

It should be noted herein that the first terminal still feeds back the ACK on a PSFCH corresponding to a next transmission resource after the A transmission resources.

A14. A moment after feedback resources corresponding to Bth transmission resources from the moment at which the acknowledgement is fed back In some embodiments, B is a positive integer, and B represents any transmission resource. That is, in this case, for a TB, it is determined that the first terminal enters the non-active time starting from PSFCHs corresponding to several (for example, four) transmission resources after the moment at which the first terminal feeds back the ACK, and the first terminal no longer monitors a target object in this period of time.

It should be noted herein that the first terminal still feeds back the ACK on a PSFCH corresponding to a next transmission resource after the B transmission resources.

A15. A moment after C transmission resources from the last feedback resource

In some embodiments, C is a positive integer, and C represents any transmission resource. That is, in this case, for a TB, it is determined that the first terminal enters the non-active time starting from several (for example, two) transmission resources after the moment at which the first terminal does not send a PSFCH, and the first terminal no longer monitors a target object in this period of time.

It should be noted herein that the first terminal still does not send a PSFCH on a PSFCH corresponding to a next transmission resource after the C transmission resources.

A16. A moment after feedback resources corresponding to Dth transmission resources from the last feedback resource In some embodiments, D is a positive integer, and D represents any transmission resource. That is, in this case, for a TB, it is determined that the first terminal enters the non-active time starting from PSFCHs corresponding to several (for example, three) transmission resources after the moment at which the first terminal does not send a PSFCH, and the first terminal no longer monitors a target object in this period of time.

It should be noted herein that the first terminal still does not send a PSFCH on a PSFCH corresponding to a next transmission resource after the D transmission resources.

In some embodiments, when the first terminal sends a PSSCH and/or a PSCCH, the starting moment of the non-active time includes at least one of the following:

A21. A moment after a moment at which an acknowledgement is received

That is, in this case, for a TB, after the first terminal receives an ACK sent by an associated terminal, it is determined that the first terminal enters the non-active time, and the first terminal no longer monitors a target object in this period of time.

It should be noted that the receiving an acknowledgement in this embodiment of the present disclosure means that the first terminal receives at least one acknowledgement from each associated terminal. In some embodiments, the associated terminal is all possible or expected receive terminals of the PSSCH and/or the PSCCH, or the associated terminal is a terminal receiving the PSSCH and/or the PSCCH sent by the first terminal.

Further, at least one of unicast or a multicast mechanism 2 is applicable to this case.

A22. A moment after a moment at which the last feedback resource is monitored or received In some embodiments, the feedback resource may be a PSFCH. That is, in this case, for a TB, after the first terminal fails to monitor (or receive) a PSFCH, it is determined that the first terminal enters the non-active time, and the first terminal no longer monitors a target object in this period of time.

It should be noted that the failing to monitor (or receive) a feedback resource in this embodiment of the present disclosure means that the first terminal fails to monitor (or receive) feedback resources of all associated terminals.

Further, a multicast mechanism 1 is applicable to this case.

A23. A moment after E transmission resources from the moment at which the acknowledgement is received In some embodiments, E is a positive integer, and E represents any transmission resource. That is, in this case, for a TB, it is determined that the first terminal enters the non-active time starting from several (for example, two) transmission resources after the moment at which the first terminal receives the ACK, and the first terminal no longer monitors a target object in this period of time.

A24. A moment after feedback resources corresponding to Fth transmission resources from the moment at which the acknowledgement is received In some embodiments, F is a positive integer, and F represents any transmission resource. That is, in this case, for a TB, it is determined that the first terminal enters the non-active time starting from PSFCHs corresponding to several (for example, four) transmission resources after the moment at which the first terminal receives the ACK, and the first terminal no longer monitors a target object in this period of time.

A25. A moment after G transmission resources from the moment at which no feedback resource is monitored or received In some embodiments, G is a positive integer, and G represents any transmission resource. That is, in this case, for a TB, it is determined that the first terminal enters the non-active time starting from several (for example, two) transmission resources after the moment at which the first terminal fails to monitor (or receive) a PSFCH, and the first terminal no longer monitors a target object in this period of time.

A26. A moment after feedback resources corresponding to Hth transmission resources from the moment at which the last feedback resource is monitored or received In some embodiments, H is a positive integer, and H represents any transmission resource. That is, in this case, for a TB, it is determined that the first terminal enters the non-active time starting from PSFCHs corresponding to several (for example, three) transmission resources after the moment at which the first terminal fails to monitor (or receive) a PSFCH, and the first terminal no longer monitors a target object in this period of time.

Further, it should be noted that when the first terminal sends a PSSCH and/or a PSCCH, the first time domain resource includes at least one of the following:

A31. Feedback resource that does not correspond to a sent transmission resource

In some embodiments, the first time domain resource herein is a feedback resource that is not related to the sent transmission resource.

It should be noted that a feedback resource related to the sent transmission resource is a feedback resource that may be associated with one or some transmissions, and a terminal receiving a transmission or some transmissions may feed back HARQ-ACK information of the transmission or these transmissions on a corresponding feedback resource. A feedback resource that is not related to the sent transmission resource is a feedback resource that does not correspond to the sent transmission resource. For example, a transmission resource 1 is sent, HARQ-ACK information corresponding to the transmission resource 1 is transmitted on a PSFCH resource 1 at a PSFCH resource moment 1, and another PSFCH moment or PSFCH resource may be understood as a feedback resource that is not related to the transmission resource 1.

That is, in this case, the first terminal does not monitor (skips) a PSFCH that is not related to a transmission resource sent by the first terminal.

A32. PSSCH resource and/or PSCCH resource in a different resource configuration from that of a sent transmission resource In some embodiments, the transmission resource in this case is a PSSCH resource and/or a PSCCH resource. Further, in this case, the PSSCH resource and/or PSCCH resource in a different resource configuration from that of a sent transmission resource is a PSSCH resource and/or a PSCCH resource included in different SL CGs or different SL SPS or different SL DCI from the transmission resource sent by the first terminal, or a PSSCH resource and/or a PSCCH resource indicated or reserved by a terminal other than the first terminal, or a PSSCH resource and/or a PSCCH resource in a different target resource range from that of the transmission resource sent by the first terminal. The different target resource ranges may be at least one of different resource pools, different BWPs, or different carriers.

That is, the first time domain resource herein is a PSSCH resource and/or a PSCCH resource that are/is not related to the sent transmission resource. In this case, the first terminal does not monitor (skips) a PSSCH resource and/or a PSCCH resource that are/is not related to a transmission resource sent by the first terminal.

It may be understood that the first terminal monitors only a PSSCH resource and/or a PSCCH resource in a same resource configuration as that of the sent transmission resource. The PSSCH resource and/or the PSCCH resource in the same resource configuration as that of the sent transmission resource may be further understood as a PSSCH resource and/or a PSCCH resource included in a same SL CG or same SL SPS or same SL DCI as the transmission resource sent by the first terminal, or a PSSCH resource and/or a PSCCH resource indicated or reserved by the first terminal, or a PSSCH resource and/or a PSCCH resource in a same target resource range as that of the transmission resource sent by the first terminal. The same target resource range may be at least one of a same resource pool, a same BWP, or a same carrier.

A33. Transmission resource other than a first target transmission resource

That is, in this case, the first terminal monitors the first target transmission resource and does not monitor (skips) a transmission resource other than the first target transmission resource.

Further, it should be noted that the first target transmission resource includes at least one of the following:

A331. a transmission resource indicated by obtained sidelink downlink control information (SL DCI, DCI for scheduling an SL transmission resource);

A332. a transmission resource included in obtained sidelink semi-persistent scheduling (SL SPS); and A333. a transmission resource included in an obtained sidelink configured grant (SL CG).

A34. Feedback resource corresponding to a transmission resource other than the first target transmission resource That is, in this case, the first terminal monitors a PSFCH corresponding to the first target transmission resource and does not monitor (skips) a PSFCH corresponding to a transmission resource other than the first target transmission resource. For example, the first terminal sends one piece of SCI indicating three transmission resources, and the first terminal does not monitor a PSFCH resource other than PSFCH resources associated with the three transmission resources.

Further, it should be further noted that when the first terminal receives a PSFCH and/or a PSCCH, the first time domain resource includes at least one of the following:

A35. Transmission resource other than a first target transmission resource

That is, in this case, the first terminal monitors the first target transmission resource and does not monitor (skips) a transmission resource other than the first target transmission resource.

Further, it should be noted that the first target transmission resource includes at least one of the following:

A351. a transmission resource indicated or reserved by obtained sidelink control information SCI;

A352. a transmission resource indicated by obtained SL DCI;

A353. a transmission resource included in obtained SL SPS; or

A354. a transmission resource included in an obtained SL CG.

For example, the first terminal receives one piece of SCI indicating three transmission resources, and the first terminal does not monitor a transmission resource other than the three transmission resources in a time range from a resource 1 to a resource 3.

A36. Feedback resource corresponding to a transmission resource other than the first target transmission resource Further, it should be noted that when performing unicast transmission, the first terminal performs operations in A35 to A36 in at least one of an active time such as an active timer. It should be noted herein that in this case, the first terminal (that is, PSSCH/PSCCH RX UE) may only need to monitor transmission of a specific or some specific transmit terminals (TX UE), and therefore may not monitor (skip) another transmission in this time period.

It should be further noted herein that the non-monitoring (skipping) mentioned in the foregoing descriptions of A31 to A36 means that the terminal does not consider these irrelevant resources in a process of performing corresponding processing. For example, these irrelevant resources are not received, sent, or measured, and are not considered as candidate resources or available resources.

In some embodiments, the second time domain range includes an active time and/or a second time domain resource.

It should be noted that the active time and/or the second time domain resource may be configured or preconfigured by the network side device, stipulated in a protocol, indicated by another terminal, or determined by the first terminal itself. It should be noted that, for example, the first terminal deduces the active time and/or the second time domain resource by using a resource pool configuration and indication information in SL DCI. It should be noted that the second time domain resource is a related resource, that is, the terminal needs to consider these related resources in a process of corresponding processing.

Further, it should be further noted that if a first resource is outside the second time domain range, the first terminal does not monitor the first resource outside the second time domain range, where the first resource is at least one transmission resource in at least one first target resource obtained by the first terminal, or the first resource is a feedback resource corresponding to at least one transmission resource in at least one first target resource obtained by the first terminal.

Further, the first target resource includes at least one of the following:

A41. a transmission resource indicated or reserved by SCI;

A42. a transmission resource indicated by SL DCI;

A43. a transmission resource included in SL SPS; or

A44. a transmission resource included in an SL CG.

1. Further, when the first resource is the at least one transmission resource in the at least one first target resource obtained by the first terminal, the transmission or reception configuration method in this embodiment of the present disclosure further includes:

for the at least one transmission resource, determining first information and/or a first feedback resource that are/is fed back to an associated terminal.

It should be noted that, in this case, the first terminal receives a PSSCH and/or a PSCCH. In some embodiments, the first information includes one of the following:

A51. Negative acknowledgement

That is, in this case, the first terminal needs to feed back a NACK to a terminal sending a PSSCH and/or a PSCCH.

A52. Acknowledgement

That is, in this case, the first terminal needs to feed back an ACK to a terminal sending a PSSCH and/or a PSCCH.

A53. Hybrid automatic repeat request acknowledgement (HARQ-ACK) state corresponding to the last transmission resource in the second time domain range That is, in this case, the first terminal needs to feed back a HARQ-ACK state corresponding to the last transmission resource in the active time to a terminal sending a PSSCH and/or a PSCCH.

In some embodiments, the first feedback resource includes one of the following:

A61. Feedback resource corresponding to the at least one transmission resource

That is, in this case, the first terminal feeds back, on a PSFCH corresponding to at least one transmission resource indicated by SCI, information to a terminal sending a PSSCH and/or a PSCCH.

A62. Feedback resource corresponding to the last transmission resource in the second time domain range That is, in this case, the first terminal feeds back, on a PSFCH corresponding to the last transmission resource in the active time, information to a terminal sending a PSSCH and/or a PSCCH.

2. Further, when the first resource is the at least one transmission resource in the at least one first target resource obtained by the first terminal, or the first resource is the feedback resource corresponding to the at least one transmission resource in the at least one first target resource obtained by the first terminal, the transmission or reception configuration method in this embodiment of the present disclosure further includes:

for the first resource, determining second information and/or a second feedback resource that are/is fed back to a network side device.

1. It should be noted herein that when the first terminal receives a PSSCH and/or a PSCCH, and the first resource is the at least one transmission resource in the at least one first target resource obtained by the first terminal, the second information includes one of the following:

A71. Negative acknowledgement

It should be noted that, in this case, the first terminal may directly feed back a NACK to a base station, or may first send a negative acknowledgement to a terminal sending a PSSCH and/or a PSCCH, and then the terminal that sends the PSSCH and/or the PSCCH feeds back a NACK to a base station.

A72. HARQ-ACK state corresponding to the last transmission resource in the second time domain range 2. It should be noted herein that when the first terminal sends a PSSCH and/or a PSCCH, and the first resource is the feedback resource corresponding to the at least one transmission resource in the at least one first target resource obtained by the first terminal, the second information includes one of the following:

A81. a negative acknowledgement;

A82. an acknowledgement; or

A83. a hybrid automatic repeat request acknowledgement HARQ-ACK state corresponding to the last transmission resource in the second time domain range.

For example, if a HARQ-ACK corresponding to the last transmission in the active time is an ACK, the user feeds back the ACK for transmission outside the active time.

It should be further noted that, regardless of whether the first terminal sends a PSSCH and/or a PSCCH or the first terminal receives a PSSCH and/or a PSCCH, or regardless of whether the first resource is the at least one transmission resource in the at least one first target resource obtained by the first terminal, or the first resource is the feedback resource corresponding to the at least one transmission resource in the at least one first target resource obtained by the first terminal, the second feedback resource includes one of the following:

A91. Uplink feedback resource corresponding to the last transmission resource in the second time domain range That is, in this case, the first terminal feeds back information to a base station on an uplink feedback resource corresponding to the last transmission resource in the active time.

A92. Uplink feedback resource corresponding to a feedback resource corresponding to the last transmission resource in the second time domain range That is, in this case, the first terminal feeds back information to a base station on an uplink feedback resource corresponding to a PSFCH corresponding to the last transmission resource in the active time.

A93. Uplink feedback resource corresponding to the latest transmission resource

That is, in this case, the first terminal feeds back information to a base station on the uplink feedback resource corresponding to the latest transmission resource.

A94. Uplink feedback resource corresponding to a feedback resource corresponding to the latest transmission resource That is, in this case, the first terminal feeds back information to a base station on an uplink feedback resource corresponding to a PSFCH corresponding to the latest transmission resource.

The uplink feedback resource corresponding to the feedback resource in A92 and A94 is an uplink feedback resource, such as a PUCCH and/or a PUSCH, used for reporting information on the feedback resource to a network device. For example, HARQ-ACK information corresponding to a transmission or some transmissions is a NACK. A user receiving the transmission or these transmissions feeds back the NACK on a PSFCH resource corresponding to the transmission, and a user sending the transmission or these transmissions or the user receiving the transmission or these transmissions may report the NACK to a base station through an uplink feedback resource.

Further, it should be noted that the transmission resource in this embodiment of the present disclosure is an actual transmission resource (actual transmitted resource or actually received resource, that is, transmission is performed at the resource location), a candidate transmission resource (candidate resource, that is, resource transmission may be performed or resource transmission may not be performed at a transmission location), or a reserved transmission resource (reserved resources, that is, resource transmission is not performed at the transmission location).

Further, it should be noted that the transmission resource in this embodiment of the present disclosure may also be interpreted as transmission, for example, actual transmission (or actual reception), candidate transmission, or reserved transmission.

Further, it should be noted that the transmission resource in this embodiment of the present disclosure includes: a transmission used for receiving and/or a transmission used for sending.

Further, it should be noted that the transmission in this embodiment of the present disclosure includes: receiving and/or sending.

It should be further noted that, as described in this embodiment of the present disclosure, the entering an active time, the entering a second time domain range in which a target object is monitored, and the starting a timer for monitoring a target object have the same meaning. Similarly, the entering a non-active time, the entering a first time domain range in which a target object is not monitored, the disabling a timer for monitoring target object, and the enabling a timer for not monitoring a target object have the same meaning.

It should be further noted that the transmission or reception configuration in this embodiment of the present disclosure may correspond to a resource pool. For example, a resource pool 1 corresponds to a transmission or reception configuration 1, and a resource pool 2 corresponds to a transmission or reception configuration 2.

It should be noted that, in this embodiment of the present disclosure, a transmission or reception configuration indicating a first time domain range in which a first terminal does not monitor a target object and/or a second time domain range in which the first terminal monitors a target object is used, and a target object is monitored when the transmission or reception configuration meets a requirement, thereby avoiding a packet loss of the terminal and reducing energy consumption of the terminal, and avoiding a case that different terminals, or a terminal and a base station may have different understanding of feedback content and/or resources, to ensure scheduling accuracy and improve communication reliability and resource utilization.

It should be noted that the foregoing is a case 1 that can be implemented by the first terminal. In addition, the first terminal may further implement:

Case 2

In this case, the transmission or reception configuration method is performed by a first terminal and includes:

obtaining a transmission or reception configuration, where the transmission or reception configuration is used to configure a target parameter; and executing a transmission control behavior of a target object in a time domain range corresponding to the target parameter according to the transmission or reception configuration, where the target parameter includes a second preset time domain range or a second preset timer; and the target object includes at least one of a first response, a feedback resource, a reference signal RS, or a measurement report.

Further, it should be noted that when the target parameter is the second preset time domain range, the second preset time domain range includes a third time domain range and/or a fourth time domain range.

The executing a transmission control behavior of a target object in a time domain range corresponding to the target parameter includes at least one of the following:

skipping sending, by the first terminal, the target object in the third time domain range; or sending, by the first terminal, the target object in the fourth time domain range.

Further, it should be noted that when the target parameter is the second preset timer, the second preset timer includes a third timer and/or a fourth timer.

The executing a transmission control behavior of a target object in a time domain range corresponding to the target parameter includes at least one of the following:

skipping sending, by the first terminal, the target object during running of the third timer; or sending, by the first terminal, the target object during running of the fourth timer.

It should be noted that in this case, a length of the time domain range is greater than or equal to at least one of the following parameters:

a time interval between sidelink downlink control information SL DCI and a third preset feedback resource; or a time interval between a third preset transmission resource and a fourth preset feedback resource.

Further, it should be noted that the third preset feedback resource is a feedback resource corresponding to the $X^{th}$ SL transmission resource in SL transmission resources scheduled or activated by the SL DCI, where X is a positive integer.

Further, it should be noted that the third preset transmission resource includes one of the following:

the $A^{th}$ transmission resource in transmission resources included in sidelink semi-persistent scheduling SL SPS;

the $B^{th}$ transmission resource in transmission resources included in a sidelink configured grant SL CG;

the $C^{th}$ transmission resource in transmission resources scheduled by sidelink downlink control information SL DCI;

the $D^{th}$ transmission resource in transmission resources indicated by sidelink control information SCI;

the $E^{th}$ transmission resource in transmission resources reserved by the SCI; or the $F^{th}$ transmission resource in transmission resources corresponding to one transport block, where A, B, C, D, E, and F are all positive integers.

Further, it should be noted that the time interval between the third preset transmission resource and the fourth preset feedback resource includes one of the following:

a time interval between feedback resources corresponding to the $H^{th}$ transmission resource and the $J^{th}$ transmission resource; or a time interval between feedback resources corresponding to the $J^{th}$ transmission resource and the $K^{th}$ transmission resource, where H, J, and K are all positive integers.

In this case, the transmission or reception configuration method further includes:

obtaining a second target moment, where the second target moment is a second preset moment, or the second target moment is a moment obtained when the second preset moment is shifted by a second offset; and the second target moment is a start point of the time domain range.

Further, it should be noted that the second preset moment is related to at least one of the following cases:

a case that a resource is preempted;

a case that sidelink downlink control information SL DCI is received;

a case that fourth preset transmission is performed;

a case that sidelink control information SCI is received;

a case that a physical sidelink control channel PSCCH is received;

a case that a physical sidelink shared channel PSSCH is received;

a case that a first request is obtained;

a case that a target object is sent;

a case that an acknowledgement is sent;

a case that no target object is sent;

a case that no negative acknowledgement is sent;

a case that the first terminal determines that transmission succeeds;

a case that the first terminal cannot transmit a target object;

a case that the first terminal cannot transmit SCI;

a case that the first terminal cannot transmit a PSSCH; or a case that the first terminal cannot transmit a PSCCH.

In some embodiments, when the target parameter is the second preset timer, after the obtaining a second target moment, the method further includes:

enabling the second preset timer at the second target moment.

Further, it should be noted that the second preset timer includes a third timer or a fourth timer, and a second target moment of the third timer is different from a second target moment of the fourth timer.

Further, it should be noted that when the target parameter is a second preset time domain range and the second preset time domain range includes a third time domain range or a fourth time domain range, a second target moment of the third time domain range is different from a second target moment of the fourth time domain range.

In some embodiments, it should be noted that the case that the acknowledgment is sent includes:

a case that at least one acknowledgement is sent for a multicast mechanism 2 or unicast.

In some embodiments, it should be noted that the case that no target object is sent includes one of the following:

a case that the first terminal sends no target object on feedback resources corresponding to all transmission resources for a multicast mechanism 1;

a case that the first terminal sends no target object on a feedback resource corresponding to the $L^{th}$ transmission resource for the multicast mechanism 1; or a case that the first terminal sends no target object on a feedback resource corresponding to the last transmission resource for the multicast mechanism 1, where L is a positive integer.

In some embodiments, it should be noted that the case that no negative acknowledgement is sent includes one of the following:

a case that the first terminal sends no negative acknowledgement on feedback resources corresponding to all transmission resources for the multicast mechanism 1;

a case that the first terminal sends no negative acknowledgement on a feedback resource corresponding to the $M^{th}$ transmission resource for the multicast mechanism 1; or a case that the first terminal sends no negative acknowledgement on a feedback resource corresponding to the last transmission resource for the multicast mechanism 1, where M is a positive integer.

Case 3

In this case, the transmission or reception configuration method is performed by a first terminal and includes:

obtaining a transmission or reception configuration, where the transmission or reception configuration is used to configure a target parameter; and executing at least one of the following according to the transmission or reception configuration:

executing a detection control behavior in a time domain range corresponding to the target parameter;

executing a measurement control behavior in the time domain range corresponding to the target parameter;

executing a resource selection or reselection control behavior in the time domain range corresponding to the target parameter; or executing a transmission control behavior of a target object in the time domain range corresponding to the target parameter, where the target parameter includes a first preset time domain range or a first preset timer.

It should be noted that the target object includes at least one of a first request, sidelink control information SCI, a physical sidelink control channel PSCCH, a physical sidelink shared channel PSSCH, a reference signal RS, or a measurement report.

In some embodiments, it should be noted that when the target parameter is the first preset time domain range, the first preset time domain range includes a first time domain range and/or a second time domain range; and the executing a detection control behavior in a time domain range corresponding to the target parameter includes:

executing no detection in the first time domain range, and/or executing detection in the second time domain range;

or when the target parameter is the first preset timer, the first preset timer includes a first timer and/or a second timer; and the executing a detection control behavior in a time domain range corresponding to the target parameter includes: executing no detection during running of the first timer, and/or executing detection during running of the second timer.

In some embodiments, it should be noted that when the target parameter is the first preset time domain range, the first preset time domain range includes a first time domain range and/or a second time domain range; and the executing a measurement control behavior in a time domain range corresponding to the target parameter includes:

executing no measurement in the first time domain range, and/or executing measurement in the second time domain range;

or when the target parameter is the first preset timer, the first preset timer includes a first timer and/or a second timer; and the executing a measurement control behavior in a time domain range corresponding to the target parameter includes: executing no measurement during running of the first timer, and/or executing measurement during running of the second timer.

In some embodiments, it should be noted that when the target parameter is the first preset time domain range, the first preset time domain range includes a first time domain range and/or a second time domain range; and the executing a resource selection or reselection control behavior in the time domain range corresponding to the target parameter includes at least one of the following:

executing no resource selection or reselection in the first time domain range;

executing resource selection or reselection in second time domain range;

skipping selecting or reselecting, by the first terminal, a resource in the first time domain range; or selecting or reselecting, by the first terminal, a resource in the second time domain range;

or when the target parameter is the first preset timer, the first preset timer includes a first timer and/or a second timer; and the executing a resource selection or reselection control behavior in the time domain range corresponding to the target parameter includes at least one of the following:

executing no resource selection or reselection during running of the first timer;

executing resource selection or reselection during running of the second timer;

skipping selecting or reselecting, by the first terminal, a resource during running of the first timer; or selecting or reselecting, by the first terminal, a resource during running of the second timer.

In some embodiments, it should be noted that when the target parameter is the first preset time domain range, the first preset time domain range includes a first time domain range and/or a second time domain range; and the executing a transmission control behavior of a target object in the time domain range corresponding to the target parameter includes:

skipping monitoring or receiving, by the first terminal, the target object in the first time domain range, and/or monitoring or receiving, by the first terminal, the target object in the second time domain range;

or when the target parameter is the first preset timer, the first preset timer includes a first timer and/or a second timer; and the executing a transmission control behavior of a target object in the time domain range corresponding to the target parameter includes: skipping monitoring or receiving, by the first terminal, the target object during running of the first timer, and/or monitoring or receiving, by the first terminal, the target object during running of the second timer.

It should be further noted that when the time domain range includes a first sub-time domain range and/or a second sub-time domain range, a length of at least one of the first sub-time domain range or the second sub-time domain range is greater than or equal to at least one of the following parameters:

a packet delay budget PDB;

32 slots;

M×P, where P is a reservation period, a service period, a period indicated by sidelink control information SCI, a period of a sidelink configured grant SL CG, or a period of sidelink semi-persistent scheduling, and M is a positive integer; and J slots or milliseconds, where J is greater than or equal to 32+N and is less than or equal to 32+N+K−1, or J is greater than or equal to RA_duration+N and is less than or equal to RA_duration+N+K−1, N is a period of a feedback resource, K is a minimum time interval between a transmission resource and a corresponding feedback resource, RA_duration is a time domain range or a time domain distance occupied by two transmission resources in preset transmission resources, and the preset transmission resource is a transmission resource included in SL SPS, a transmission resource included in an SL CG, a transmission resource scheduled by SL DCI, or a transmission resource indicated by SCI, where when the target parameter is the first preset timer, and the first preset timer includes a first timer and/or a second timer, the first sub-time domain range corresponds to timing duration of the first timer, and the second sub-time domain range corresponds to timing duration of the second timer; and when the target parameter is the first preset time domain range and the first preset time domain range includes a first time domain range and/or a second time domain range, the first sub-time domain range corresponds to the first time domain range, and the second sub-time domain range corresponds to the second time domain range.

Further, it should be noted that, in this case, the transmission or reception configuration method further includes:

obtaining a first target moment, where the first target moment is a first preset moment, or the first target moment is a moment obtained when the first preset moment is shifted by a first offset; and the first target moment is a start point of the time domain range.

Further, it should be noted that when the target parameter is the first preset timer, after the obtaining a first target moment, the method further includes:

enabling the first preset timer at the first target moment.

In some embodiments, the first preset moment includes at least one of the following:

a moment at which a resource is preempted;

a moment at which the last transmission resource is located;

a moment related to a case that the last transmission resource is received;

a moment at which a feedback resource corresponding to the first transmission resource is located;

a moment at which a feedback resource corresponding to the last transmission resource is located;

a moment at which a feedback resource is sent;

a moment at which a first response is sent;

a moment at which a physical uplink control channel PUCCH or a physical uplink shared channel PUSCH is sent;

a moment related to a case that a negative acknowledgment is sent;

a moment related to a case that the first response is not sent;

a moment related to a case that no feedback resource is sent;

a moment at which a transmission resource on which a target object is not monitored or received is located when the target object is not monitored or received on a reserved or indicated resource; or a moment at which a feedback resource corresponding to the transmission resource on which the target object is not monitored or received is located when the target object is not monitored or received on the reserved or indicated resource.

Further, it should be noted that the moment at which the feedback resource is sent includes: a moment at which the $A^{th}$ feedback resource is sent or a moment at which the feedback resource corresponding to the last transmission resource is sent, where A is a positive integer.

Further, it should be noted that the moment related to the case that the negative acknowledgment is sent includes at least one of the following:

a moment related to a case that the first negative acknowledgment is sent;

a moment related to a case that each negative acknowledgment is sent; or a moment related to a case that the last feedback resource is sent and feedback content is a negative acknowledgment.

Further, it should be noted that the moment related to the case that no feedback resource is sent includes at least one of the following:

a moment related to a case that no feedback resource is sent for the first time;

a moment related to a case that no feedback resource is sent each time; or a moment related to a case that no feedback resource is sent last time if all feedback resources are not sent.

Further, it should be noted that the moment at which the transmission resource on which the target object is not monitored or received is located when the target object is not monitored or received on the reserved or indicated resource includes:

a moment at which the last transmission resource on which the target object is not monitored or received is located when the target object is not monitored or received on the reserved or indicated resource.

Further, it should be noted that the moment at which the feedback resource corresponding to the transmission resource on which the target object is not monitored or received is located when the target object is not monitored or received on the reserved or indicated resource includes:

a moment at which a feedback resource corresponding to the last transmission resource on which the target object is not monitored or received is located when the target object is not monitored or received on the reserved or indicated resource.

In some embodiments, the first preset moment includes at least one of the following:

a moment related to the latest transmission resource in obtained at least one target resource; or a moment related to a feedback resource corresponding to the latest transmission resource in the obtained at least one target resource, where the target resource includes at least one of the following: a transmission resource reserved or indicated by sidelink control information SCI, a transmission resource indicated by sidelink downlink control information SL DCI, a transmission resource included in sidelink semi-persistent scheduling SL SPS, or a transmission resource included in a sidelink configured grant SL CG.

In some embodiments, the target resource is a target resource within an active time.

In some embodiments, the first preset moment includes at least one of the following:

a moment related to the obtained last piece of sidelink control information SCI;

a moment related to the obtained last piece of sidelink downlink control information SL DCI; or a moment at which the reserved or indicated $R^{th}$ resource is located—n, where n is a preset value.

It should be further noted that a length of the second time domain range or the second timer includes a time of at least one of the following transmission resources obtained by the first terminal:

a transmission resource indicated or reserved by at least one piece of sidelink control information SCI;

a transmission resource indicated by at least one piece of sidelink downlink control information SL DCI;

a transmission resource included in at least one piece of sidelink semi-persistent scheduling SL SPS; or a transmission resource included in at least one sidelink configured grant SL CG.

It should be noted herein that the first terminal may separately implement the foregoing three cases, or may implement at least two of the foregoing three cases.

Figure 7:
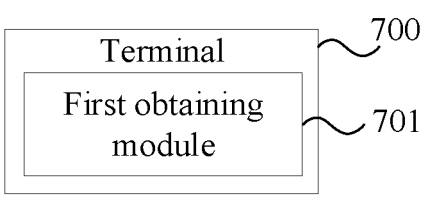
FIG. 7 is a first schematic module diagram of a terminal according to an embodiment of the present disclosure.

As shown in FIG. 7, an embodiment of the present disclosure provides a terminal 700, where the terminal 700 is a first terminal and includes:

a first obtaining module 701, configured to obtain a transmission or reception configuration, where the transmission or reception configuration is used to indicate a first time domain range in which the first terminal does not monitor a target object and/or a second time domain range in which the first terminal monitors a target object.

In some embodiments, the terminal further includes:

a first executing module, configured to: if a first resource is outside the second time domain range, skip monitoring, by the first terminal, the first resource outside the second time domain range, where the first resource is at least one transmission resource in at least one first target resource obtained by the first terminal, or the first resource is a feedback resource corresponding to at least one transmission resource in at least one first target resource obtained by the first terminal; and the first target resource includes at least one of the following:

a transmission resource indicated or reserved by sidelink control information SCI;

a transmission resource indicated by sidelink downlink control information SL DCI;

a transmission resource included in sidelink semi-persistent scheduling SL SPS; or a transmission resource included in a sidelink configured grant SL CG.

In some embodiments, when the first resource is the at least one transmission resource in the at least one first target resource obtained by the first terminal, the terminal further includes:

a first determining module, configured to: for the at least one transmission resource, determine first information and/or a first feedback resource that are/is fed back to an associated terminal.

Further, the first information includes one of the following:

a negative acknowledgement;

an acknowledgement; or a hybrid automatic repeat request acknowledgement HARQ-ACK state corresponding to the last transmission resource in the second time domain range.

Further, the first feedback resource includes one of the following:

the feedback resource corresponding to the at least one transmission resource; or a feedback resource corresponding to the last transmission resource in the second time domain range.

In some embodiments, the terminal further includes:

a second determining module, configured to: for the first resource, determine second information and/or a second feedback resource that are/is fed back to a network side device.

Further, when the first resource is the at least one transmission resource in the at least one first target resource obtained by the first terminal, the second information includes one of the following:

a negative acknowledgement;

a hybrid automatic repeat request acknowledgement HARQ-ACK state corresponding to the last transmission resource in the second time domain range.

Further, when the first resource is the feedback resource corresponding to the at least one transmission resource in the at least one first target resource obtained by the first terminal, the second information includes one of the following:

a negative acknowledgement;

an acknowledgement; or a hybrid automatic repeat request acknowledgement HARQ-ACK state corresponding to the last transmission resource in the second time domain range.

Further, the second feedback resource includes one of the following:

an uplink feedback resource corresponding to the last transmission resource in the second time domain range;

an uplink feedback resource corresponding to a feedback resource corresponding to the last transmission resource in the second time domain range;

an uplink feedback resource corresponding to the latest transmission resource; or an uplink feedback resource corresponding to a feedback resource corresponding to the latest transmission resource.

In some embodiments, the first time domain range includes a non-active time and/or a first time domain resource.

In some embodiments, the second time domain range includes an active time and/or a second time domain resource.

Further, a starting moment of the non-active time includes at least one of the following:

a moment after a moment at which an acknowledgement is fed back;

a moment after a moment at which no feedback resource is sent;

a moment after A transmission resources from the moment at which the acknowledgement is fed back;

a moment after feedback resources corresponding to Bth transmission resources from the moment at which the acknowledgement is fed back;

a moment after C transmission resources from the moment at which no feedback resource is sent; or a moment after feedback resources corresponding to Dth transmission resources from the moment at which no feedback resource is sent, where A, B, C, and D are all positive integers.

Further, a starting moment of the non-active time includes at least one of the following:

a moment after a moment at which an acknowledgement is received;

a moment after a moment at which no feedback resource is monitored or received;

a moment after E transmission resources from the moment at which the acknowledgement is received;

a moment after feedback resources corresponding to Fth transmission resources from the moment at which the acknowledgement is received;

a moment after G transmission resources from the moment at which no feedback resource is monitored or received; or a moment after feedback resources corresponding to Hth transmission resources from the moment at which no feedback resource is monitored or received, where E, F, G and H are all positive integers.

In some embodiments, that an acknowledgment is received includes:

receiving at least one acknowledgement from each associated terminal.

In some embodiments, that no feedback resource is monitored or received includes:

failing to monitor or receive feedback resources of all associated terminals.

In some embodiments, the first time domain resource includes at least one of the following:

a feedback resource that does not correspond to a sent transmission resource;

a PSSCH resource and/or a PSCCH resource in a different resource configuration from that of a sent transmission resource;

a transmission resource other than a first target transmission resource; and a feedback resource corresponding to a transmission resource other than the first target transmission resource, where the first target transmission resource includes at least one of the following:

a transmission resource indicated or reserved by obtained sidelink control information SCI;

a transmission resource indicated by obtained sidelink downlink control information SL DCI;

a transmission resource included in obtained sidelink semi-persistent scheduling SL SPS; or a transmission resource included in an obtained sidelink configured grant SL CG.

It should be noted that the terminal embodiment is the terminal corresponding to the foregoing transmission or reception configuration method performed by the first terminal. All implementations of the foregoing embodiment are applicable to the terminal embodiment, and a same technical effect can also be achieved.

Figure 8:
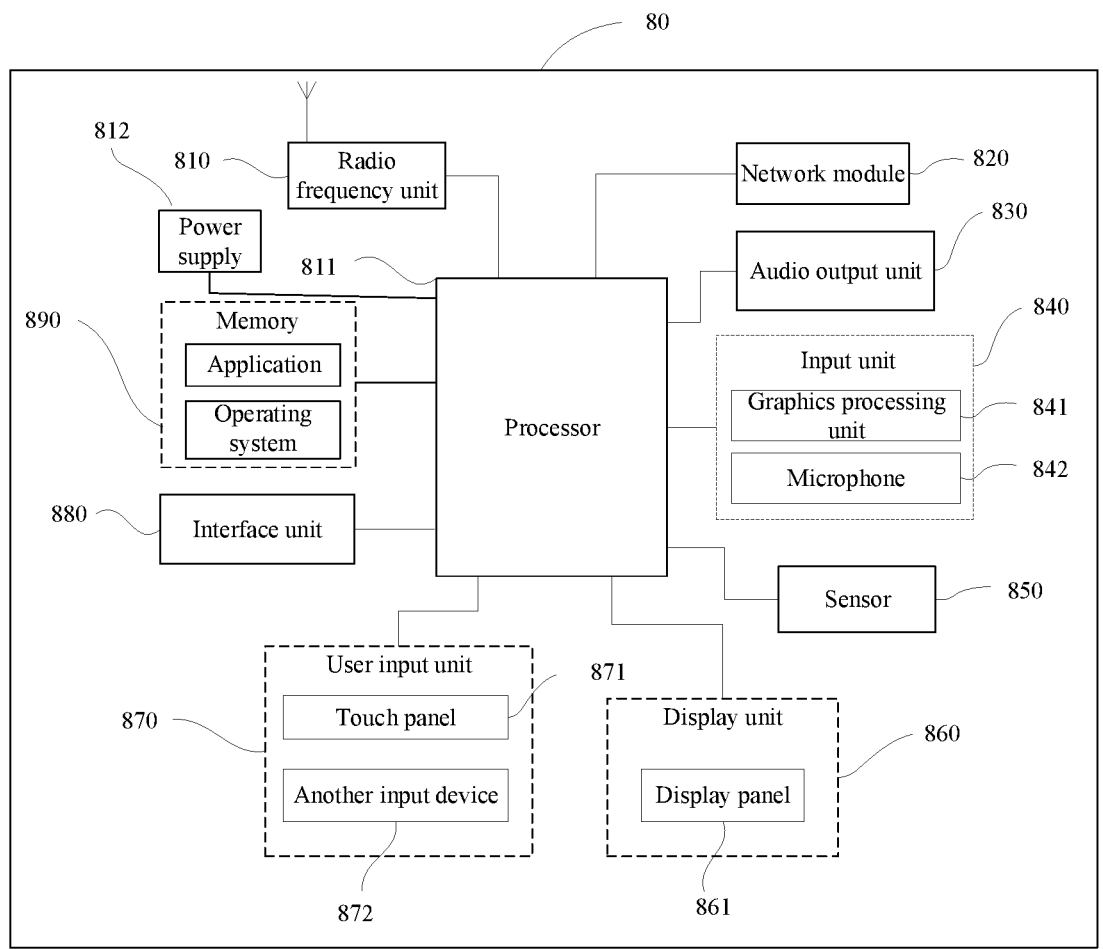
FIG. 8 is a structural block diagram of a terminal according to an embodiment of the present disclosure.

FIG. 8 is a schematic diagram of a hardware structure of a terminal according to an embodiment of the present disclosure.

The terminal 80 is a first terminal, and includes but is not limited to components such as a radio frequency unit 810, a network module 820, an audio output unit 830, an input unit 840, a sensor 850, a display unit 860, a user input unit 870, an interface unit 880, a memory 890, a processor 811, and a power supply 812. It can be understood by a person skilled in the art that, the terminal structure shown in FIG. 8 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a wearable device, a pedometer, and the like.

The processor 811 is configured to obtain a transmission or reception configuration, where the transmission or reception configuration is used to indicate a first time domain range in which the first terminal does not monitor a target object and/or a second time domain range in which the first terminal monitors a target object.

According to the terminal in this embodiment of the present disclosure, a transmission or reception configuration indicating a first time domain range in which a first terminal does not monitor a target object and/or a second time domain range in which the first terminal monitors a target object is used, and a target object is monitored when the transmission or reception configuration meets a requirement, thereby limiting a transmission behavior of the terminal, avoiding a packet loss, and improving communication reliability and resource utilization.

It should be understood that, in this embodiment of the present disclosure, the radio frequency unit 810 may be configured to receive and send information or a signal in a call process. In some embodiments, after receiving downlink data from a network side device, the radio frequency unit 810 sends the downlink data to the processor 811 for processing. In addition, the radio frequency unit 810 sends uplink data to the network side device. Usually, the radio frequency unit 810 includes but is not limited to an antenna, at least one amplifier, a transceiver, a coupler, a low noise amplifier, a duplexer, and the like. In addition, the radio frequency unit 810 may communicate with a network and another device through a wireless communication system.

The terminal provides wireless broadband Internet access for the user by using the network module 820, for example, helping the user to send and receive an e-mail, browse a web page, and access streaming media.

The audio output unit 830 may convert audio data received by the radio frequency unit 810 or the network module 820 or stored in the memory 890 into an audio signal and output the audio signal as a sound. In addition, the audio output unit 830 may further provide an audio output (for example, a call signal received voice, or a message received voice) related to a specific function implemented by the terminal 80. The audio output unit 830 includes a speaker, a buzzer, a telephone receiver, and the like.

The input unit 840 is configured to receive an audio signal or a video signal. The input unit 840 may include a Graphics Processing Unit (GPU) 841 and a microphone 842, and the graphics processing unit 841 processes image data of a still picture or video obtained by an image capture apparatus (such as a camera) in a video capture mode or an image capture mode. A processed image frame may be displayed on the display unit 860. The image frame processed by the graphics processing unit 841 may be stored in the memory 890 (or another storage medium) or sent by using the radio frequency unit 810 or the network module 820. The microphone 842 may receive a sound and can process such sound into audio data. Processed audio data may be converted, in a call mode, into a format that can be sent to a mobile communication network side device by using the radio frequency unit 810 for output.

The terminal 80 further includes at least one type of sensor 850, such as a light sensor, a motion sensor, and another sensor. In some embodiments, the light sensor includes an ambient light sensor and a proximity sensor. The ambient light sensor may adjust luminance of the display panel 861 based on brightness of ambient light. The proximity sensor may turn off the display panel 861 and/or backlight when the terminal 80 moves to an ear. As a type of the motion sensor, an accelerometer sensor may detect an acceleration value in each direction (generally, three axes), and detect a value and a direction of gravity when the accelerometer sensor is static, and may be used for recognizing a terminal posture (such as screen switching between landscape and portrait modes, a related game, or magnetometer posture calibration), a function related to vibration recognition (such as a pedometer or a knock), and the like. The sensor 850 may further include a fingerprint sensor, a pressure sensor, an iris sensor, a molecular sensor, a gyroscope, a barometer, a hygrometer, a thermometer, an infrared sensor, and the like. Details are not described herein.

The display unit 860 is configured to display information entered by a user or information provided for a user. The display unit 860 may include a display panel 861. The display panel 861 may be configured in a form of a Liquid Crystal Display (LCD), an Organic Light-Emitting Diode (OLED), or the like.

The user input unit 870 may be configured to receive input numeral or character information, and generate key signal input related to user setting and functional control of the terminal. In some embodiments, the user input unit 870 includes a touch panel 871 and another input device 872. The touch panel 871 is also referred to as a touchscreen, and may collect a touch operation performed by a user on or near the touch panel 871 (such as an operation performed by a user on the touch panel 871 or near the touch panel 871 by using any proper object or accessory, such as a finger or a stylus). The touch panel 871 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 811, and can receive and execute a command sent by the processor 811. In addition, the touch panel 871 may be of a resistive type, a capacitive type, an infrared type, a surface acoustic wave type, or the like. The user input unit 870 may include another input device 872 in addition to the touch panel 871. In some embodiments, the another input device 872 may include but is not limited to a physical keyboard, a functional button (such as a volume control button or a power on/off button), a trackball, a mouse, and a joystick. Details are not described herein.

Further, the touch panel 871 may cover the display panel 861. When detecting the touch operation on or near the touch panel 871, the touch panel 871 transmits the touch operation to the processor 811 to determine a type of a touch event, and then the processor 811 provides corresponding visual output on the display panel 861 based on the type of the touch event. In FIG. 8, although the touch panel 871 and the display panel 861 are used as two independent parts to implement input and output functions of the terminal, in some embodiments, the touch panel 871 and the display panel 861 may be integrated to implement the input and output functions of the terminal. This is not limited herein.

The interface unit 880 is an interface for connecting an external apparatus with the terminal 80. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 880 may be configured to receive input (for example, data information and power) from an external apparatus and transmit the received input to one or more elements in the terminal 80 or may be configured to transmit data between the terminal 80 and an external apparatus.

The memory 890 may be configured to store a software program and various data. The memory 890 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 890 may include a high-speed random access memory, and may further include a nonvolatile memory, for example, at least one magnetic disk storage device, a flash storage device, or another volatile solid-state storage device.

The processor 811 is a control center of the terminal, and connects all parts of the entire terminal by using various interfaces and lines. By running or executing a software program and/or a module stored in the memory 890 and invoking data stored in the memory 890, the processor 811 performs various functions of the terminal and data processing, to perform overall monitoring on the terminal. The processor 811 may include one or more processing units. In some embodiments, an application processor and a modem processor may be integrated into the processor 811. The application processor mainly processes an operating system, a user interface, an application, and the like. The modem processor mainly processes wireless communications. It can be understood that, in some embodiments, the modem processor may not be integrated into the processor 811.

The terminal 80 may further include the power supply 812 (such as a battery) that supplies power to each component. In some embodiments, the power supply 812 may be logically connected to the processor 811 by using a power management system, so as to implement functions such as charging, discharging, and power consumption management by using the power management system.

In addition, the terminal 80 includes some function modules not shown, and details are not described herein.

It should be further noted that the processor 810 is further configured to implement other processes in the transmission or reception configuration method performed by the first terminal in the foregoing embodiment, and details are not described herein again.

An embodiment of the present disclosure further provides a terminal, including a processor 811, a memory 890, and a computer program that is stored in the memory 890 and that can be run on the processor 811. When the computer program is executed by the processor 811, the foregoing processes of the transmission or reception configuration method embodiment performed by the first terminal side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the foregoing processes of the transmission or reception configuration method embodiment performed by the first terminal side are implemented and a same technical effect can be achieved. To avoid repetition, details are not described herein again. The computer-readable storage medium includes a Read-only Memory (ROM), a Random Access Memory (RAM), a magnetic disk, or an optical disc.

Figures 9, 10:
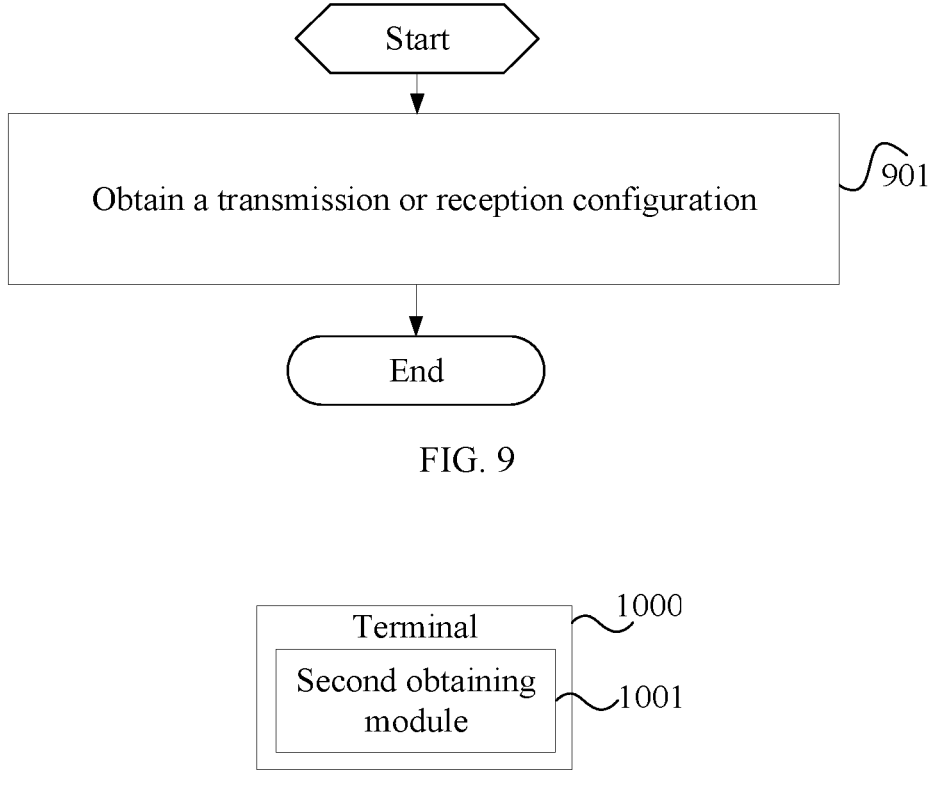
FIG. 9 is a second schematic flowchart of a transmission or reception configuration method according to an embodiment of the present disclosure.
FIG. 10 is a second schematic module diagram of a terminal according to an embodiment of the present disclosure.

As shown in FIG. 9, an embodiment of the present disclosure provides a transmission or reception configuration method, performed by a second terminal and including:

Step 901: Obtain a transmission or reception configuration.

It should be noted that the transmission or reception configuration is used to indicate a third time domain range in which the second terminal does not send a target object and/or a fourth time domain range in which the second terminal sends a target object.

Further, it should be noted that the target object includes at least one of a first request, sidelink control information (SCI), a PSCCH, a PSSCH, a reference signal (RS), or a measurement report; and/or the target object includes at least one of a first response, a feedback resource (for example, a physical sidelink feedback channel (PSFCH)), a reference signal (RS), or a measurement report.

In some embodiments, the first request may include at least one of a synchronization request, a reference signal request, a measurement report request (for example, at least one of a CSI report request, an RSRP report request, an RSRQ report request, and an RSSI report request), a connection establishment request, a connection resume request, a link resume request, a link re-establishment request, a reconfiguration request, a retransmission request, or the like.

The reference signal may include: a CSI-RS, a PT-RS, an uplink sounding signal (SRS), a positioning reference signal (PRS), and the like.

The measurement report may be, for example, a channel state information report (CSI report), a reference signal received power report (RSRP report), a reference signal received quality report (RSRQ report), or a received signal strength indicator report (RSSI report).

In some embodiments, the first response may include a response to at least one of a synchronization request, a connection establishment request, a connection resume request, a link resume request, a link re-establishment request, a reconfiguration request, a retransmission request, or the like, for example, at least one of allowing or succeeding in synchronization, allowing or succeeding in establishing a connection, allowing or succeeding in resuming a connection, allowing or succeeding in resuming a link, allowing or succeeding in re-establishing a link, reconfiguring, and retransmitting, where the allowing or succeeding in synchronization may include at least one of allowing or succeeding being as synchronization reference, allowing or succeeding in transmitting a synchronization signal, and the like.

Further, it should be noted that the transmission or reception configuration in this embodiment of the present disclosure may restrict receiving and/or sending. When the transmission or reception configuration restricts at least receiving of a terminal, the transmission or reception configuration may be considered as a sidelink discontinuous reception (DRX) configuration.

It should be noted that because the second terminal may perform different transmission actions at different moments, target objects of the second terminal at different moments may be the same or may be different. The following separately uses examples in which the second terminal receives a physical sidelink shared channel (PSSCH) and/or a physical sidelink control channel (PSCCH) and the second terminal sends a PSSCH and/or a PSCCH to describe the target object.

In some embodiments, when the second terminal receives a PSSCH and/or a PSCCH, the target object includes at least one of a first response, a feedback resource (for example, a physical sidelink feedback channel (PSFCH)), a reference signal (RS), or a measurement report.

In some embodiments, when the second terminal sends a PSSCH and/or a PSCCH, the target object includes at least one of a first request, sidelink control information (SCI), a PSCCH, a PSSCH, a reference signal (RS), and a measurement report.

In some embodiments, the third time domain range includes a non-active time and/or a third time domain resource.

It should be noted that the non-active time and/or the third time domain resource may be configured or preconfigured by a network side device, stipulated in a protocol, indicated by another terminal, or determined by the second terminal. It should be noted that, for example, the second terminal deduces the non-active time and/or the third time domain resource by using a resource pool configuration and indication information in sidelink downlink control information (SL DCI, that is, DCI for scheduling, activating, or deactivating an SL transmission resource).

In some embodiments, the third time domain resource is an irrelevant resource.

The following separately uses examples in which the second terminal receives a PSSCH and/or a PSCCH and the second terminal sends a PSSCH and/or a PSCCH to describe a starting moment of the non-active time:

In some embodiments, when the second terminal sends a PSSCH and/or a PSCCH, the starting moment of the non-active time includes at least one of the following:

B11. A moment after a moment at which an acknowledgement is received

That is, in this case, for a TB, after the second terminal receives an ACK sent by an associated terminal, it is determined that the second terminal enters the non-active time, and the second terminal no longer sends a target object in this period of time.

It should be noted that the receiving an acknowledgement in this embodiment of the present disclosure means that the second terminal receives at least one acknowledgement from each associated terminal. In some embodiments, the associated terminal is all possible or expected receive terminals of the PSSCH and/or the PSCCH sent by the second terminal, or the associated terminal is a terminal receiving the PSSCH and/or the PSCCH sent by the second terminal.

B12. A moment after a moment at which no feedback resource is monitored or received In some embodiments, the feedback resource may be a PSFCH. That is, in this case, for a TB, after the second terminal fails to monitor (or receive) a PSFCH, it is determined that the second terminal enters the non-active time, and the first terminal no longer sends a target object in this period of time.

It should be noted that the failing to monitor (or receive) a feedback resource in this embodiment of the present disclosure means that the second terminal fails to monitor (or receive) feedback resources of all associated terminals.

It should be noted that the associated terminal mentioned herein is a terminal that expects to receive a resource sent by the second terminal, or a terminal that is expected by the second terminal to receive a target object. For example, when the second terminal sends a multicast packet, the associated terminal may be all other member terminals in the group, and the second terminal expects to receive target objects sent by the member terminals.

B13. A moment after A transmission resources from the moment at which the acknowledgement is received In some embodiments, A is a positive integer, and A represents any transmission resource. That is, in this case, for a TB, it is determined that the second terminal enters the non-active time starting from several (for example, two) transmission resources after the moment at which the second terminal receives the ACK, and the second terminal no longer sends a target object in this period of time.

B14. A moment after feedback resources corresponding to Bth transmission resources from the moment at which the acknowledgement is received In some embodiments, B is a positive integer, and B represents any transmission resource. That is, in this case, for a TB, it is determined that the second terminal enters the non-active time starting from PSFCHs corresponding to several (for example, four) transmission resources after the moment at which the second terminal receives the ACK, and the second terminal no longer sends a target object in this period of time.

B15. A moment after C transmission resources from the moment at which no feedback resource is monitored or received In some embodiments, C is a positive integer, and C represents any transmission resource. That is, in this case, for a TB, it is determined that the second terminal enters the non-active time starting from several (for example, two) transmission resources after the moment at which the second terminal fails to monitor (or receive) a PSFCH, and the second terminal no longer sends a target object in this period of time.

B16. A moment after feedback resources corresponding to Dth transmission resources from the moment at which no feedback resource is monitored or received In some embodiments, D is a positive integer, and D represents any transmission resource. That is, in this case, for a TB, it is determined that the second terminal enters the non-active time starting from PSFCHs corresponding to several (for example, three) transmission resources after the moment at which the second terminal fails to monitor (or receive) a PSFCH, and the second terminal no longer sends a target object in this period of time.

In some embodiments, when the second terminal receives a PSSCH and/or a PSCCH, the starting moment of the non-active time includes at least one of the following:

B21. A moment after a moment at which an acknowledgement is fed back

That is, in this case, for a transport block (TB), after the second terminal feeds back an acknowledgement (ACK), it is determined that the second terminal enters the non-active time, and the second terminal no longer sends a target object in this period of time.

It should be noted that the feeding back an acknowledgment is feeding back at least one acknowledgment.

Further, at least one of unicast and a multicast mechanism 2 (option 2) is applicable to this case.

B22. A moment after a moment at which no feedback resource is sent

In some embodiments, the feedback resource may be a PSFCH. That is, in this case, for a TB, after the second terminal does not send a PSFCH, it is determined that the second terminal enters the non-active time, and the second terminal no longer sends a target object in this period of time.

Further, a multicast mechanism 1 (option 1) is applicable to this case.

B23. A moment after E transmission resources from the moment at which the acknowledgement is sent In some embodiments, E is a positive integer, and E represents any transmission resource. That is, in this case, for a TB, it is determined that the second terminal enters the non-active time starting from several (for example, two) transmission resources after the moment at which the second terminal feeds back the ACK, and the second terminal no longer sends a target object in this period of time.

It should be noted herein that the second terminal still sends the ACK on a PSFCH corresponding to a next transmission resource after the E transmission resources.

B24. A moment after feedback resources corresponding to Fth transmission resources from the moment at which the acknowledgement is sent In some embodiments, F is a positive integer, and F represents any transmission resource. That is, in this case, for a TB, it is determined that the second terminal enters the non-active time starting from PSFCHs corresponding to several (for example, four) transmission resources after the moment at which the second terminal feeds back the ACK, and the second terminal no longer sends a target object in this period of time.

It should be noted herein that the second terminal still sends the ACK on a PSFCH corresponding to a next transmission resource after the F transmission resources.

B25. A moment after G transmission resources from the moment at which no feedback resource is sent In some embodiments, G is a positive integer, and G represents any transmission resource. That is, in this case, for a TB, it is determined that the second terminal enters the non-active time starting from several (for example, two) transmission resources after the moment at which the second terminal does not send a PSFCH, and the second terminal no longer sends a target object in this period of time.

It should be noted herein that the second terminal still does not send a PSFCH on a PSFCH corresponding to a next transmission resource after the G transmission resources.

B26. A moment after feedback resources corresponding to Hth transmission resources from the moment at which no feedback resource is sent In some embodiments, H is a positive integer, and H represents any transmission resource. That is, in this case, for a TB, it is determined that the second terminal enters the non-active time starting from PSFCHs corresponding to several (for example, three) transmission resources after the moment at which the second terminal does not send a PSFCH, and the second terminal no longer sends a target object in this period of time.

It should be noted herein that the second terminal still does not send a PSFCH on a PSFCH corresponding to a next transmission resource after the H transmission resources.

Further, it should be noted that when the second terminal receives a PSSCH and/or a PSCCH, the third time domain resource includes at least one of the following:

B31. Feedback resource that does not correspond to a monitored or received transmission resource In some embodiments, the third time domain resource in this case is a feedback resource that is not related to the monitored or received transmission resource.

It should be noted that a feedback resource related to the monitored (or received) transmission resource is a feedback resource that may be associated with one or some transmissions, and a terminal receiving a transmission or some transmissions may feed back HARQ-ACK information of the transmission or these transmissions on a corresponding feedback resource. A feedback resource that is not related to the monitored (or received) transmission resource is a feedback resource that does not correspond to the monitored (or received) transmission resource. For example, a transmission resource 1 is received, HARQ-ACK information corresponding to the transmission resource 1 is transmitted on a PSFCH resource 1 at a PSFCH resource moment 1, and another PSFCH moment or PSFCH resource may be understood as a feedback resource that is not related to the transmission resource 1.

That is, in this case, the second terminal does not monitor, skips, or does not send a PSFCH that is not related to a transmission resource monitored (or received) by the second terminal.

B32. PSSCH resource and/or a PSCCH resource in a different resource configuration from that of the monitored or received transmission resource In some embodiments, the transmission resource in this case is a PSSCH resource and/or a PSCCH resource. Further, in this case, the PSSCH resource and/or a PSCCH resource in a different resource configuration from that of the monitored or received transmission resource is a PSSCH resource and/or a PSCCH resource included in different SL CGs or different SL SPS or different SL DCI from the transmission resource monitored (or received) by the second terminal, or a PSSCH resource and/or a PSCCH resource indicated or reserved by another terminal, where the another terminal is a terminal other than a terminal sending a PSSCH resource and/or a PSCCH resource monitored (or received) by the second terminal, or a PSSCH resource and/or a PSCCH resource in a different target resource range from that of the transmission resource monitored (or received) by the second terminal. The different target resource ranges may be at least one of different resource pools, different BWPs, and different carriers.

In some embodiments, the third time domain resource in this case is a PSSCH resource and/or a PSCCH resource that are/is not related to the monitored or received transmission resource. In this case, the second terminal does not monitor (skips) a PSSCH resource and/or a PSCCH resource that are/is not related to a transmission resource monitored (or received) by the second terminal.

It may be understood that the second terminal monitors only a PSSCH resource and/or a PSCCH resource in a same resource configuration as that of the monitored or received transmission resource. The PSSCH resource and/or the PSCCH resource in the same resource configuration as that of the monitored or received transmission resource may be further understood as a PSSCH resource and/or a PSCCH resource included in a same SL CG or same SL SPS or same SL DCI as the transmission resource monitored (or received) by the second terminal, or a PSSCH resource and/or a PSCCH resource indicated or reserved by a terminal sending a PSSCH resource and/or a PSCCH resource monitored (or received) by the second terminal, or a PSSCH resource and/or a PSCCH resource in a same target resource range as that of the transmission resource monitored (or received) by the second terminal. The same target resource range may be at least one of a same resource pool, a same BWP, and a same carrier.

B33. Transmission resource other than a first target transmission resource

That is, in this case, the second terminal monitors the first target transmission resource and does not monitor (skips) a transmission resource other than the first target transmission resource.

Further, it should be noted that the first target transmission resource includes at least one of the following:

B331. a transmission resource indicated by obtained SL DCI;

B332. a transmission resource included in obtained SL SPS; and

B333. a transmission resource included in an obtained SL CG.

B34. Feedback resource corresponding to a transmission resource other than the first target transmission resource That is, in this case, the second terminal sends a PSFCH corresponding to the first target transmission resource and does not monitor, skips, or does not send a PSFCH corresponding to a transmission resource other than the first target transmission resource.

For example, the second terminal sends one piece of SCI indicating three transmission resources, and the second terminal does not send a PSFCH resource other than PSFCH resources associated with the three transmission resources.

Further, it should be noted that when performing unicast transmission, the second terminal performs operations in B31 to B34 in at least one of an active time such as an active timer (inactivity timer). It should be noted herein that, in this case, a terminal (that is, PSSCH/PSCCH TX UE, that is, the second terminal) that sends a PSSCH and/or a PSCCH may only need to feed back transmission of a specific or some specific receive terminals (RX UE), and therefore may not send another transmission in this time period.

Further, it should be further noted that when the second terminal sends a PSSCH and/or a PSCCH, the third time domain resource includes at least one of the following:

B35. Transmission resource other than a first target transmission resource

That is, in this case, the second terminal sends the first target transmission resource and does not send a transmission resource other than the first target transmission resource.

Further, it should be noted that the first target transmission resource includes at least one of the following:

B351. a transmission resource indicated or reserved by obtained SCI;

B352. a transmission resource indicated by obtained SL DCI;

B353. a transmission resource included in obtained SL SPS; and

B354. a transmission resource included in an obtained SL CG.

B36. Feedback resource corresponding to a transmission resource other than the first target transmission resource For example, the second terminal receives one piece of SCI indicating three transmission resources, and the second terminal does not monitor a feedback resource corresponding to a transmission resource other than the three transmission resources in a time range from a resource 1 to a resource 3.

Further, it should be noted that when performing unicast transmission, the second terminal performs operations in B35 to B36 in at least one of an active time such as an active timer. It should be noted herein that in this case, the second terminal (that is, PSSCH/PSCCH TX UE) may only need to send transmission of a specific or some specific receive terminals (RX UE), and therefore may not send another transmission in this time period.

In some embodiments, the second time domain range includes an active time and/or a second time domain resource.

It should be noted that the active time and/or the related resource may be configured or preconfigured by the network side device, stipulated in a protocol, indicated by another terminal, or determined by the second terminal itself. It should be noted that, for example, the second terminal deduces the active time and/or the related resource by using a resource pool configuration and indication information in SL DCI. It should be noted that the fourth time domain resource is a related resource, that is, the terminal needs to consider these related resources in a process of corresponding processing.

It should be noted that the foregoing limitation on the starting moment of the non-active time may also be used to limit the starting moment of the active time, that is, B21 to B26 are also applicable to the starting moment of the active time.

Further, it should be further noted that if a second resource is outside the fourth time domain range, the second terminal does not send the second resource outside the fourth time domain range, where the second resource is at least one transmission resource in at least one first target resource obtained by the second terminal, or the second resource is a feedback resource corresponding to at least one transmission resource in at least one first target resource obtained by the second terminal.

Further, the first target resource includes at least one of the following:

B41. a transmission resource indicated or reserved by SCI;

B42. a transmission resource indicated by SL DCI;

B43. a transmission resource included in SL SPS; and

B44. a transmission resource included in an SL CG.

1. Further, when the second resource is the at least one transmission resource in the at least one first target resource obtained by the second terminal, the transmission or reception configuration method in this embodiment of the present disclosure further includes:

for the at least one transmission resource, receiving first information and/or a first feedback resource of an associated terminal.

It should be noted that, in this case, the second terminal sends a PSSCH and/or a PSCCH. In some embodiments, the first information includes one of the following:

B51. Negative acknowledgement

That is, in this case, the second terminal needs to receive a NACK fed back by a terminal receiving a PSSCH and/or a PSCCH.

B52. Acknowledgement

That is, in this case, the second terminal needs to receive an ACK that is fed back by a terminal receiving a PSSCH and/or a PSCCH.

B53. Hybrid automatic repeat request acknowledgement HARQ-ACK state corresponding to the last transmission resource in the fourth time domain range.

That is, in this case, the second terminal needs to receive a HARQ-ACK state that is corresponding to the last transmission resource in an active time and that is fed back by a terminal receiving a PSSCH and/or a PSCCH.

In some embodiments, the first feedback resource is a feedback resource for receiving the first information. The first feedback resource includes one of the following:

B61. Feedback resource corresponding to the at least one transmission resource

That is, in this case, the second terminal sends, on a PSFCH corresponding to at least one transmission resource indicated by SCI, feedback information to a terminal receiving a PSSCH and/or a PSCCH.

B62. Feedback resource corresponding to the last transmission resource in the fourth time domain range That is, in this case, the second terminal sends, on a PSFCH corresponding to the last transmission resource in the active time, feedback information to a terminal receiving a PSSCH and/or a PSCCH.

2. Further, when the second resource is the at least one transmission resource in the at least one first target resource obtained by the second terminal, or the second resource is the feedback resource corresponding to the at least one transmission resource in the at least one first target resource obtained by the second terminal, the transmission or reception configuration method in this embodiment of the present disclosure further includes:

for the second resource, determining second information and/or a second feedback resource that are/is fed back to a network side device.

1. It should be noted herein that when the second terminal sends a PSSCH and/or a PSCCH, and the second resource is the at least one transmission resource in the at least one first target resource obtained by the second terminal, the second information includes one of the following:

B71. a negative acknowledgement; and

B72. a hybrid automatic repeat request acknowledgement HARQ-ACK state corresponding to the last transmission resource in the fourth time domain range.

2. It should be noted herein that when the second terminal receives a PSSCH and/or a PSCCH, and the second resource is the feedback resource corresponding to the at least one transmission resource in the at least one first target resource obtained by the second terminal, the second information includes one of the following:

B81. a negative acknowledgement;

B82. an acknowledgement; and

B83. a hybrid automatic repeat request acknowledgement HARQ-ACK state corresponding to the last transmission resource in the fourth time domain range.

It should be further noted that, regardless of whether the second terminal sends a PSSCH and/or a PSCCH or the second terminal receives a PSSCH and/or a PSCCH, or regardless of whether the second resource is the at least one transmission resource in the at least one first target resource obtained by the second terminal, or the second resource is the feedback resource corresponding to the at least one transmission resource in the at least one first target resource obtained by the second terminal, the second feedback resource includes one of the following:

B91. Uplink feedback resource corresponding to the last transmission resource in the fourth time domain range That is, in this case, the second terminal feeds back information to a base station on an uplink feedback resource corresponding to the last transmission resource in the active time.

B92. Uplink feedback resource corresponding to a feedback resource corresponding to the last transmission resource in the fourth time domain range That is, in this case, the second terminal feeds back information to a base station on an uplink feedback resource corresponding to a PSFCH corresponding to the last transmission resource in the active time.

B93. Uplink feedback resource corresponding to the latest transmission resource

That is, in this case, the second terminal feeds back information to a base station on the uplink feedback resource corresponding to the latest transmission resource.

B94. Uplink feedback resource corresponding to a feedback resource corresponding to the latest transmission resource That is, in this case, the second terminal feeds back information to a base station on an uplink feedback resource corresponding to a PSFCH corresponding to the latest transmission resource.

The uplink feedback resource corresponding to the feedback resource in B92 and B94 is an uplink feedback resource, such as a PUCCH and/or a PUSCH, used for reporting information on the feedback resource to a network device. In some embodiments, HARQ-ACK information corresponding to a transmission or some transmissions is a NACK. A user receiving the transmission or these transmissions feeds back the NACK on a PSFCH resource corresponding to the transmission, and a user sending the transmission or these transmissions or the user receiving the transmission or these transmissions may report the NACK to a base station through an uplink feedback resource.

Further, it should be noted that the transmission resource in this embodiment of the present disclosure is an actual transmission resource (actual transmitted resource or actually received resource, that is, transmission is performed at the resource location), a candidate transmission resource (candidate resource, that is, resource transmission may be performed or resource transmission may not be performed at a transmission location), or a reserved transmission resource (reserved resources, that is, resource transmission is not performed at the transmission location).

Further, it should be noted that the transmission resource in this embodiment of the present disclosure may also be interpreted as transmission, for example, actual transmission (actual reception), candidate transmission, or reserved transmission.

Further, it should be noted that the transmission resource in this embodiment of the present disclosure includes: a transmission used for receiving and/or a transmission used for sending.

Further, it should be noted that the transmission in this embodiment of the present disclosure includes: receiving and/or sending.

It should be further noted that the transmission or reception configuration in this embodiment of the present disclosure may correspond to a resource pool. For example, a resource pool 1 corresponds to a transmission or reception configuration 1, and a resource pool 2 corresponds to a transmission or reception configuration 2.

It should be noted that, in this embodiment of the present disclosure, a transmission or reception configuration indicating a third time domain range in which a second terminal does not send a target object and/or a fourth time domain range in which the second terminal sends a target object is used, and a target object is sent when the transmission or reception configuration meets a requirement, thereby avoiding a packet loss of the terminal and reducing energy consumption of the terminal, and avoiding a case that different terminals, or a terminal and a base station may have different understanding of feedback content and/or resources, to ensure scheduling accuracy and improve communication reliability and resource utilization.

It should be noted that the foregoing is a case 1 that can be implemented by the second terminal. In addition, the second terminal may further implement:

Case 2

In this case, the transmission or reception configuration method is performed by a second terminal and includes:

obtaining a transmission or reception configuration, where the transmission or reception configuration is used to configure a target parameter; and executing a transmission control behavior of a target object in a time domain range corresponding to the target parameter according to the transmission or reception configuration, where the target parameter includes a first preset time domain range or a first preset timer; and the target object includes at least one of a first response, a feedback resource, a reference signal RS, and a measurement report.

Further, it should be noted that when the target parameter is the first preset time domain range, the first preset time domain range includes a first time domain range and/or a second time domain range.

The executing a transmission control behavior of a target object in a time domain range corresponding to the target parameter includes at least one of the following:

skipping monitoring or receiving, by the second terminal, the target object in the first time domain range; and monitoring or receiving, by the second terminal, the target object in the second time domain range.

Further, it should be noted that when the target parameter is the first preset timer, the first preset timer includes a first timer and/or a second timer.

The executing a transmission control behavior of a target object in a time domain range corresponding to the target parameter includes at least one of the following:

skipping monitoring or receiving, by the second terminal, the target object during running of the first timer; and monitoring or receiving, by the second terminal, the target object during running of the second timer.

It should be noted that in this case, a length of the time domain range is greater than or equal to at least one of the following parameters:

a time interval between sidelink downlink control information SL DCI and a first preset feedback resource; and a time interval between a first preset transmission resource and a second preset feedback resource.

Further, it should be noted that the first preset feedback resource is a feedback resource corresponding to the $X^{th}$ SL transmission resource in SL transmission resources scheduled or activated by the SL DCI, where X is a positive integer.

Further, it should be noted that the first preset transmission resource includes one of the following:

the $A^{th}$ transmission resource in transmission resources included in sidelink semi-persistent scheduling SL SPS;

the $B^{th}$ transmission resource in transmission resources included in a sidelink configured grant SL CG;

the $C^{th}$ transmission resource in transmission resources scheduled by sidelink downlink control information SL DCI;

the $D^{th}$ transmission resource in transmission resources indicated by sidelink control information SCI;

the $E^{th}$ transmission resource in transmission resources reserved by the SCI; and the $F^{th}$ transmission resource in transmission resources corresponding to one transport block, where A, B, C, D, E, and F are all positive integers.

Further, it should be noted that the time interval between the first preset transmission resource and the second preset feedback resource includes one of the following:

a time interval between feedback resources corresponding to the $H^{th}$ transmission resource and the $J^{th}$ transmission resource; and a time interval between feedback resources corresponding to the $J^{th}$ transmission resource and the $K^{th}$ transmission resource, where H, J, and K are all positive integers.

In this case, the transmission or reception configuration method further includes:

obtaining a first target moment, where the first target moment is a first preset moment, or the first target moment is a moment obtained when the first preset moment is shifted by a first offset; and the first target moment is a start point of the time domain range.

Further, it should be noted that the first preset moment is related to at least one of the following cases:

a case that a resource is preempted;

a case that sidelink downlink control information SL DCI is received;

a case that second preset transmission is performed;

a case that sidelink control information SCI is sent;

a case that a physical sidelink control channel PSCCH is sent;

a case that a physical sidelink shared channel PSSCH is sent;

a case that a first request is sent;

a case that a target object is received;

a case that an acknowledgement is received;

a case that no target object is monitored or received;

a case that no negative acknowledgement is monitored or received;

a case that the second terminal determines that transmission succeeds;

a case that the second terminal cannot transmit a target object;

a case that the second terminal cannot transmit SCI;

a case that the second terminal cannot transmit a PSSCH; and a case that the second terminal cannot transmit a PSCCH.

In some embodiments, when the target parameter is the first preset timer, after the obtaining a first target moment, the method further includes:

enabling the first preset timer at the first target moment.

Further, it should be noted that the first preset timer includes a first timer or a second timer, and a first target moment of the first timer is different from a first target moment of the second timer.

Further, it should be noted that when the target parameter is a first preset time domain range and the first preset time domain range includes a first time domain range or a second time domain range, a first target moment of the first time domain range is different from a first target moment of the second time domain range.

In some embodiments, it should be noted that the case that the acknowledgment is received includes:

a case that at least one acknowledgement of each associated terminal is received for a multicast mechanism 2 or unicast.

In some embodiments, it should be noted that the case that no target object is monitored or received includes one of the following:

a case that the second terminal fails to monitor or receive a target object of an associated terminal on feedback resources corresponding to all transmission resources for a multicast mechanism 1;

a case that the second terminal fails to monitor or receive the target object of the associated terminal on a feedback resource corresponding to the $L^{th}$ transmission resources for the multicast mechanism 1; and a case that the second terminal fails to monitor or receive the target object of the associated terminal on a feedback resource corresponding to the last transmission resources for the multicast mechanism 1, where L is a positive integer.

In some embodiments, it should be noted that the case that no negative acknowledgement is monitored or received includes one of the following:

a case that the second terminal fails to monitor or receive a negative acknowledgement of an associated terminal on feedback resources corresponding to all transmission resources for a multicast mechanism 1;

a case that the second terminal fails to monitor or receive the negative acknowledgement of the associated terminal on a feedback resource corresponding to the $M^{th}$ transmission resource for the multicast mechanism 1; and a case that the second terminal fails to monitor or receive the negative acknowledgement of the associated terminal on a feedback resource corresponding to the last transmission resource for the multicast mechanism 1, where M is a positive integer.

It should be further noted that, the first preset moment is related to one of the following: the case that the target object is received, the case that no target object is monitored or received, and the case that no negative acknowledgement is monitored or received; and the transmission or reception configuration method further includes at least one of the following:

determining that transmission succeeds; and no longer monitoring a feedback resource.

Case 3

In this case, the transmission or reception configuration method is performed by a second terminal and includes:

obtaining a transmission or reception configuration, where the transmission or reception configuration is used to configure a target parameter; and executing at least one of the following according to the transmission or reception configuration:

executing a sending control behavior in a time domain range corresponding to the target parameter; and executing a transmission control behavior of a target object in the time domain range corresponding to the target parameter, where the target parameter includes a second preset time domain range or a second preset timer.

It should be noted that the target object includes at least one of a first request, sidelink control information SCI, a physical sidelink control channel PSCCH, a physical sidelink shared channel PSSCH, a reference signal RS, and a measurement report.

In some embodiments, it should be noted that when the target parameter is the second preset time domain range, the second preset time domain range includes a third time domain range and/or a fourth time domain range; and the executing a sending control behavior in a time domain range corresponding to the target parameter includes:

executing no sending in the third time domain range, and/or executing sending in the fourth time domain range;

or when the target parameter is the second preset timer, the second preset timer includes a third timer and/or a fourth timer; and the executing a sending control behavior in a time domain range corresponding to the target parameter includes: executing no sending during running of the third timer, and/or executing sending during running of the fourth timer.

In some embodiments, it should be noted that when the target parameter is the second preset time domain range, the second preset time domain range includes a third time domain range and/or a fourth time domain range; and the executing a transmission control behavior of a target object in the time domain range corresponding to the target parameter includes:

skipping sending, by the second terminal, the target object in the third time domain range, and/or sending, by the second terminal, the target object in the fourth time domain range;

or when the target parameter is the second preset timer, the second preset timer includes a third timer and/or a fourth timer; and the executing a transmission control behavior of a target object in the time domain range corresponding to the target parameter includes: skipping sending, by the second terminal, the target object during running of the third timer, and/or sending, by the second terminal, the target object during running of the fourth timer.

It should be further noted that when the time domain range includes a third sub-time domain range and/or a fourth sub-time domain range, a length of at least one of the third sub-time domain range and the fourth sub-time domain range is greater than or equal to at least one of the following parameters:

a packet delay budget PDB;

32 slots;

M×P, where P is a reservation period, a service period, a period indicated by sidelink control information SCI, a period of a sidelink configured grant SL CG, or a period of sidelink semi-persistent scheduling, and M is a positive integer; and J slots or milliseconds, where J is greater than or equal to 32+N and is less than or equal to 32+N+K−1, or J is greater than or equal to RA_duration+N and is less than or equal to RA_duration+N+K−1, N is a period of a feedback resource, K is a minimum time interval between a transmission resource and a corresponding feedback resource, RA_duration is a time domain range or a time domain distance occupied by two transmission resources in preset transmission resources, and the preset transmission resource is a transmission resource included in SL SPS, a transmission resource included in an SL CG, a transmission resource scheduled by SL DCI, or a transmission resource indicated by SCI, where when the target parameter is the second preset timer, and the second preset timer includes a third timer and/or a fourth timer, the third sub-time domain range corresponds to timing duration of the third timer, and the fourth sub-time domain range corresponds to timing duration of the fourth timer; and when the target parameter is the second preset time domain range and the second preset time domain range includes a third time domain range and/or a fourth time domain range, the third sub-time domain range corresponds to the third time domain range, and the fourth sub-time domain range corresponds to the fourth time domain range.

Further, it should be noted that, in this case, the transmission or reception configuration method further includes:

obtaining a second target moment, where the second target moment is a second preset moment, or the second target moment is a moment obtained when the second preset moment is shifted by a second offset; and the second target moment is a start point of the time domain range.

Further, it should be noted that when the target parameter is the second preset timer, after the obtaining a second target moment, the method further includes:

enabling the second preset timer at the second target moment.

In some embodiments, the second preset moment includes at least one of the following:

a moment at which a resource is preempted;

a moment at which the last transmission resource is located;

a moment related to a case that the last transmission resource is sent;

a moment at which a feedback resource corresponding to the first transmission resource is located;

a moment at which a feedback resource corresponding to the last transmission resource is located;

a moment at which a feedback resource is received or monitored;

a moment at which a first response is received or monitored;

a moment at which a physical uplink control channel PUCCH or a physical uplink shared channel PUSCH is sent;

a moment related to a case that a negative acknowledgment is received or monitored;

a moment related to a case that the first response is not received or monitored;

a moment related to a case that no feedback resource is received or monitored;

a moment at which a transmission resource on which a target object is not sent is located when the target object is not sent on a reserved or indicated resource; and a moment at which a feedback resource corresponding to the transmission resource on which the target object is not sent is located when the target object is not sent on the reserved or indicated resource.

Further, it should be noted that the moment at which the feedback resource is received or monitored includes: a moment at which the $A^{th}$ feedback resource is received or monitored; or a moment at which the feedback resource corresponding to the last transmission resource is received or monitored, where A is a positive integer.

Further, it should be noted that the moment related to the case that the negative acknowledgment is received or monitored includes at least one of the following:

a moment related to a case that the first negative acknowledgment is received or monitored;

a moment related to a case that each negative acknowledgment is received or monitored; and a moment related to a case that the last feedback resource is received or monitored and feedback content is a negative acknowledgment.

Further, it should be noted that the moment related to the case that no feedback resource is received or monitored includes at least one of the following:

a moment related to a case that no feedback resource is received or monitored for the first time;

a moment related to a case that no feedback resource is received or monitored each time; and a moment related to a case that no feedback resource is received or monitored last time if all feedback resources are not received or monitored.

Further, the moment at which the transmission resource on which the target object is not sent is located when the target object is not sent on the reserved or indicated resource includes:

a moment at which the last transmission resource on which the target object is not sent is located when the target object is not sent on the reserved or indicated resource.

Further, the moment at which the feedback resource corresponding to the transmission resource on which the target object is not sent is located when the target object is not sent on the reserved or indicated resource includes:

a moment at which a feedback resource corresponding to the last transmission resource on which the target object is not sent is located when the target object is not sent on the reserved or indicated resource.

In some embodiments, the second preset moment includes at least one of the following:

a moment related to the latest transmission resource in obtained at least one target resource; and a moment related to a feedback resource corresponding to the latest transmission resource in obtained at least one target resource.

The target resource includes at least one of the following:

a transmission resource reserved or indicated by sidelink control information SCI, a transmission resource indicated by sidelink downlink control information SL DCI, a transmission resource included in sidelink semi-persistent scheduling SL SPS, and a transmission resource included in a sidelink configured grant SL CG.

In some embodiments, the target resource is a target resource within an active time.

In some embodiments, the second preset moment includes at least one of the following:

a moment related to the sent last piece of sidelink control information SCI;

a moment related to the obtained last piece of sidelink downlink control information SL DCI; and a moment at which the reserved or indicated $R^{th}$ resource is located—n, where n is a preset value.

It should be further noted that a length of the fourth time domain range or the fourth timer includes a time of at least one of the following transmission resources obtained by the second terminal:

a transmission resource indicated or reserved by at least one piece of sidelink control information SCI;

a transmission resource indicated by at least one piece of sidelink downlink control information SL DCI;

a transmission resource included in at least one piece of sidelink semi-persistent scheduling SL SPS; and a transmission resource included in at least one sidelink configured grant SL CG.

It should be noted herein that the second terminal may separately implement the foregoing three cases, or may implement at least two of the foregoing three cases.

As shown in FIG. 10, an embodiment of the present disclosure provides a terminal 1000, where the terminal 1000 is a second terminal and includes:

a second obtaining module 1001, configured to obtain a transmission or reception configuration, where the transmission or reception configuration is used to indicate a third time domain range in which the second terminal does not send a target object and/or a fourth time domain range in which the second terminal sends a target object.

In some embodiments, the second terminal device further includes:

a second executing module, configured to: if a second resource is outside the fourth time domain range, skip sending, by the second terminal, the second resource outside the fourth time domain range, where the second resource is at least one transmission resource in at least one first target resource obtained by the second terminal, or the second resource is a feedback resource corresponding to at least one transmission resource in at least one first target resource obtained by the second terminal; and the first target resource includes at least one of the following:

a transmission resource indicated or reserved by sidelink control information SCI;

a transmission resource indicated by sidelink downlink control information SL DCI;

a transmission resource included in sidelink semi-persistent scheduling SL SPS; and a transmission resource included in a sidelink configured grant SL CG.

In some embodiments, when the second resource is the at least one transmission resource in the at least one first target resource obtained by the second terminal, the terminal further includes:

a first receiving module, configured to: for the at least one transmission resource, receive first information and/or a first feedback resource of an associated terminal.

In some embodiments, the first information includes one of the following:

a negative acknowledgement;

an acknowledgement; and a hybrid automatic repeat request acknowledgement HARQ-ACK state corresponding to the last transmission resource in the fourth time domain range.

In some embodiments, the first feedback resource includes one of the following:

the feedback resource corresponding to the at least one transmission resource; and a feedback resource corresponding to the last transmission resource in the fourth time domain range.

In some embodiments, the terminal further includes:

a third determining module, configured to: for the second resource, determine second information fed back to a network side device and/or a second feedback resource for feedbacking the second information.

Further, when the second resource is the at least one transmission resource in the at least one first target resource obtained by the second terminal, the second information includes one of the following:

a negative acknowledgement;

a hybrid automatic repeat request acknowledgement HARQ-ACK state corresponding to the last transmission resource in the fourth time domain range.

Further, when the second resource is the feedback resource corresponding to the at least one transmission resource in the at least one first target resource obtained by the second terminal, the second information includes one of the following:

a negative acknowledgement;

an acknowledgement; and a hybrid automatic repeat request acknowledgement HARQ-ACK state corresponding to the last transmission resource in the fourth time domain range.

Further, the second feedback resource includes one of the following:

an uplink feedback resource corresponding to the last transmission resource in the fourth time domain range;

an uplink feedback resource corresponding to a feedback resource corresponding to the last transmission resource in the fourth time domain range;

an uplink feedback resource corresponding to the latest transmission resource; and an uplink feedback resource corresponding to a feedback resource corresponding to the latest transmission resource.

In some embodiments, the third time domain range includes a non-active time and/or a third time domain resource.

In some embodiments, the fourth time domain range includes an active time and/or a fourth time domain resource.

Further, a starting moment of the non-active time includes at least one of the following:

a moment after a moment at which an acknowledgement is received;

a moment after a moment at which no feedback resource is monitored or received;

a moment after A transmission resources from the moment at which the acknowledgement is received;

a moment after feedback resources corresponding to Bth transmission resources from the moment at which the acknowledgement is received;

a moment after C transmission resources from the moment at which no feedback resource is monitored or received; and a moment after feedback resources corresponding to Dth transmission resources from the moment at which no feedback resource is monitored or received, where A, B, C, and D are all positive integers.

Further, a starting moment of the non-active time includes at least one of the following:

a moment after a moment at which an acknowledgement is fed back;

a moment after a moment at which no feedback resource is sent;

a moment after E transmission resources from the moment at which the acknowledgement is sent;

a moment after feedback resources corresponding to Fth transmission resources from the moment at which the acknowledgement is sent;

a moment after G transmission resources from the moment at which no feedback resource is sent; and a moment after feedback resources corresponding to Hth transmission resources from the moment at which no feedback resource is sent, where E, F, G and H are all positive integers.

In some embodiments, that an acknowledgment is fed back includes: feeding back at least one acknowledgement.

In some embodiments, the third time domain resource includes at least one of the following:

a feedback resource that does not correspond to a monitored or received transmission resource;

a PSSCH resource and/or a PSCCH resource in a different resource configuration from that of the monitored or received transmission resource;

a transmission resource other than a first target transmission resource; and a feedback resource corresponding to a transmission resource other than the first target transmission resource, where the first target transmission resource includes at least one of the following:
a transmission resource indicated or reserved by obtained sidelink control information SCI;
a transmission resource indicated by obtained sidelink downlink control information SL DCI;
a transmission resource included in obtained sidelink semi-persistent scheduling SL SPS; and
a transmission resource included in an obtained sidelink configured grant SL CG.

It should be noted that the terminal embodiment is the terminal corresponding to the foregoing transmission or reception configuration method performed by the second terminal. All implementations of the foregoing embodiment are applicable to the terminal embodiment, and a same technical effect can also be achieved.

It should be further noted that an embodiment of the present disclosure further provides a terminal, where the terminal is a second terminal, and a specific structure of the second terminal is the same as the specific structure of the first terminal shown in FIG. 8.

In some embodiments, the processor of the second terminal is configured to obtain a transmission or reception configuration, where the transmission or reception configuration is used to indicate a third time domain range in which the second terminal does not send a target object and/or a fourth time domain range in which the second terminal sends a target object.

It should be further noted that the processor of the second terminal is further configured to implement other processes in the transmission or reception configuration method performed by the second terminal in the foregoing embodiment, and details are not described herein again.

An embodiment of the present disclosure further provides a terminal. The terminal is a second terminal and includes a processor, a memory, and a computer program that is stored in the memory and that can be run on the processor. When the computer program is executed by the processor, the foregoing processes of the transmission or reception configuration method embodiment performed by the second terminal side are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the foregoing processes of the transmission or reception configuration method embodiment performed by the second terminal are implemented and a same technical effect can be achieved. To avoid repetition, details are not described herein again. The computer-readable storage medium includes a Read-only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network side device, or the like) to perform the methods described in the embodiments of the present disclosure.

The foregoing descriptions are merely implementations of the present disclosure. It should be noted that a person of ordinary skill in the art may make several improvements and polishing without departing from the principle of the present disclosure and the improvements and polishing shall fall within the protection scope of the present disclosure.

The invention claimed is:

1. A transmission or reception configuration method, performed by a terminal, comprising:
obtaining a transmission or reception configuration, wherein the transmission or reception configuration comprises a fourth time domain range comprising an active time, wherein during the active time, the terminal is configured to send a target object on a sidelink;
for a second resource outside the active time, not transmitting the second resource, wherein the second resource comprises at least one of the following:
a physical sidelink shared channel (PSSCH) resource and/or a physical sidelink control channel (PSCCH) resource of at least one transmission resource indicated by sidelink downlink control information (SL DCI); or
a PSSCH resource and/or a PSCCH resource of at least one transmission resource comprised in a sidelink configured grant (SL CG); and
for the second resource outside the active time, determining second information that is fed back to a network side device, wherein the second information comprises a non-acknowledgement (NACK).

2. The transmission or reception configuration method according to claim 1,
wherein the second resource further comprises at least one of the following:
a transmission resource indicated or reserved by sidelink control information (SCI); or
a transmission resource comprised in sidelink semi-persistent scheduling SL SPS.

3. The transmission or reception configuration method according to claim 2, the transmission or reception configuration method further comprises:
for the PSSCH resource or the PSCCH resource, receiving first information or a first feedback resource of an associated terminal.

4. The transmission or reception configuration method according to claim 3, wherein the first information comprises one of the following:
a negative acknowledgement;
an acknowledgement; or
a hybrid automatic repeat request acknowledgement (HARQ-ACK) state corresponding to the last transmission resource in the active time.

5. The transmission or reception configuration method according to claim 3, wherein the first feedback resource comprises one of the following:

the feedback resource corresponding to the PSSCH resource or the PSCCH resource; or a feedback resource corresponding to the last transmission resource in the active time.

6. The transmission or reception configuration method according to claim 1, wherein the second feedback resource comprises one of the following:

an uplink feedback resource corresponding to the last transmission resource in the active time;

an uplink feedback resource corresponding to a feedback resource corresponding to the last transmission resource in the active time;

an uplink feedback resource corresponding to the latest transmission resource; or an uplink feedback resource corresponding to a feedback resource corresponding to the latest transmission resource.

7. The transmission or reception configuration method according to claim 1, wherein the transmission or reception configuration further comprises a third time domain range in which the terminal does not send the target object, wherein the third time domain range comprises a non-active time or a third time domain resource.

8. The transmission or reception configuration method according to claim 7, wherein a starting moment of the non-active time comprises at least one of the following:

a moment after a moment at which an acknowledgement is received;

a moment after a moment at which no feedback resource is monitored or received;

a moment after A transmission resources from the moment at which the acknowledgement is received;

a moment after feedback resources corresponding to Bth transmission resources from the moment at which the acknowledgement is received;

a moment after C transmission resources from the moment at which no feedback resource is monitored or received; or a moment after feedback resources corresponding to Dth transmission resources from the moment at which no feedback resource is monitored or received, wherein:

A, B, C, and D are all positive integers.

9. The transmission or reception configuration method according to claim 7, wherein a starting moment of the non-active time comprises at least one of the following:

a moment after a moment at which an acknowledgement is fed back;

a moment after a moment at which no feedback resource is sent;

a moment after E transmission resources from the moment at which the acknowledgement is sent;

a moment after feedback resources corresponding to Fth transmission resources from the moment at which the acknowledgement is sent;

a moment after G transmission resources from the moment at which no feedback resource is sent; or a moment after feedback resources corresponding to Hth transmission resources from the moment at which no feedback resource is sent, wherein:

E, F, G and H are all positive integers.

10. The transmission or reception configuration method according to claim 9, wherein that an acknowledgment is fed back comprises:

at least one acknowledgement is fed back.

11. The transmission or reception configuration method according to claim 7, wherein the third time domain resource comprises at least one of the following:

a feedback resource that does not correspond to a monitored or received transmission resource;

a PSSCH resource or a PSCCH resource in a different resource configuration from that of the monitored or received transmission resource;

a transmission resource other than a first target transmission resource; or a feedback resource corresponding to a transmission resource other than the first target transmission resource, wherein:

the first target transmission resource comprises at least one of the following:

a transmission resource indicated or reserved by obtained sidelink control information (SCI);

a transmission resource indicated by obtained sidelink downlink control information (SL DCI);

a transmission resource comprised in obtained sidelink semi-persistent scheduling (SL SPS); or a transmission resource comprised in an obtained sidelink configured grant (SL CG).

12. A terminal, comprising:

a memory storing a computer program; and a processor coupled to the memory and configured to execute the computer program to perform operations comprising:

obtaining a transmission or reception configuration, wherein the transmission or reception configuration comprises a fourth time domain range comprising an active time, wherein during the active time, the terminal is configured to send a target object on a sidelink;

for a second resource outside the active time, not transmitting the second resource, wherein the second resource comprises at least one of the following:

a physical sidelink shared channel (PSSCH) resource and/or a physical sidelink control channel (PSCCH) resource of at least one transmission resource indicated by sidelink downlink control information (SL DCI); or a PSSCH resource and/or a PSCCH resource of at least one transmission resource comprised in a sidelink configured grant (SL CG); and for the second resource outside the active time, determining second information that is fed back to a network side device, wherein the second information comprises a non-acknowledgement (NACK).

13. The terminal according to claim 12, wherein the second resource further comprises at least one of the following:

a transmission resource indicated or reserved by sidelink control information SCI; or a transmission resource comprised in sidelink semi-persistent scheduling SL SPS.

14. A non-transitory computer-readable storage medium, storing a computer program, wherein the computer program, when executed by a processor of a terminal, performs operations comprising:

obtaining a transmission or reception configuration, wherein the transmission or reception configuration comprises a fourth time domain range comprising an active time, wherein during the active time, the terminal is configured to send a target object on a sidelink;

for a second resource outside the active time, not transmitting the second resource, wherein the second resource comprises at least one of the following:

a physical sidelink shared channel (PSSCH) resource and/or a physical sidelink control channel (PSCCH) resource of at least one transmission resource indicated by sidelink downlink control information (SL DCI); or a PSSCH resource and/or a PSCCH resource of at least one transmission resource comprised in a sidelink configured grant (SL CG); and for the second resource outside the active time, determining second information that is fed back to a network side device, wherein the second information comprises a non-acknowledgement (NACK).

* * * * *